(12) United States Patent
Evenshaug et al.

(10) Patent No.: US 7,359,863 B1
(45) Date of Patent: Apr. 15, 2008

(54) CONDITION COMPONENT FRAMEWORK FOR REINSURANCE

(75) Inventors: Bjornar Evenshaug, Oslo (NO); Harald Sverdrup-Thygeson, Oslo (NO)

(73) Assignee: Computer Sciences Corporation, Austin, TX (US)

( * ) Notice: Subject to any disclaimer, the term of this patent is extended or adjusted under 35 U.S.C. 154(b) by 1511 days.

(21) Appl. No.: 09/676,018

(22) Filed: Sep. 29, 2000

Related U.S. Application Data

(60) Provisional application No. 60/157,223, filed on Sep. 30, 1999.

(51) Int. Cl.
*G06Q 40/00* (2006.01)
(52) U.S. Cl. .......................................................... 705/4
(58) Field of Classification Search .................... 705/1, 705/4; 717/116; 715/514; 707/103
See application file for complete search history.

(56) References Cited

U.S. PATENT DOCUMENTS

| | | | |
|---|---|---|---|
| 4,553,206 A | 11/1985 | Smutek et al. | |
| 4,812,966 A | 3/1989 | Takagi et al. | |
| 4,831,526 A | 5/1989 | Luchs et al. | |
| 4,837,693 A | 6/1989 | Schotz | |
| 4,878,167 A | 10/1989 | Kapulka et al. | |
| 4,975,840 A | 12/1990 | DeTore et al. | |
| 4,987,538 A | 1/1991 | Johnson et al. | |
| 4,992,972 A | 2/1991 | Brooks et al. | |
| 5,093,911 A | 3/1992 | Parks et al. | |
| 5,099,422 A | 3/1992 | Foresman et al. | |
| 5,155,806 A | 10/1992 | Hoeber et al. | |

(Continued)

FOREIGN PATENT DOCUMENTS

EP 0 280 773 9/1988

(Continued)

OTHER PUBLICATIONS

Daskalopulu et al., A Constraing-Driven System for Contract Assembly, 1995, Proceedings of the 5th International Conference on Artificial Intelligence and Law, pp. 62-70.*

(Continued)

*Primary Examiner*—C. Luke Gilligan
(74) *Attorney, Agent, or Firm*—Meyertons, Hood, Kivlin, Kowert & Goetzel, P.C.; Eric B. Meyertons

(57) ABSTRACT

An improved method and system for configuring components of a reinsurance contract to process reinsurance business transactions. Reinsurance users may use the improved method and system for configuring a multi-dimensional reinsurance contract to process reinsurance business transactions with increased customization, re-use of existing functionality and decreased development time. An object-oriented, multi-dimensional reinsurance contract framework may represent a reinsurance contract. An object-oriented condition component framework may represent a condition dimension of a reinsurance contract. The condition component framework may permit the addition and/or modification of condition components of the reinsurance contract. These components may comprise, for example, configuring or changing the premium limits, consolidation conditions, and other conditions for a reinsurance contract. The condition components may be implemented as reusable objects. The multi-dimensional reinsurance contract framework and the condition component framework may also include an object-oriented graphical user interface. The graphical user interface may include a plurality of displays, along with a navigational tool to enable users to navigate through a hierarchy of displays related to the reinsurance contract.

41 Claims, 13 Drawing Sheets

U.S. PATENT DOCUMENTS

| | | |
|---|---|---|
| 5,157,768 A | 10/1992 | Hoeber et al. |
| 5,191,522 A | 3/1993 | Bosco et al. ............... 705/4 |
| 5,201,044 A | 4/1993 | Frey, Jr. et al. |
| 5,233,513 A | 8/1993 | Doyle |
| 5,241,671 A | 8/1993 | Reed et al. |
| 5,287,448 A | 2/1994 | Nicol et al. |
| 5,307,262 A | 4/1994 | Ertel |
| 5,307,265 A | 4/1994 | Winans |
| 5,386,566 A | 1/1995 | Hamanaka et al. |
| 5,394,555 A | 2/1995 | Hunter et al. |
| 5,432,904 A | 7/1995 | Wong |
| 5,434,994 A | 7/1995 | Shaheen et al. |
| 5,446,653 A * | 8/1995 | Miller et al. ............... 705/4 |
| 5,455,947 A | 10/1995 | Suzuki et al. |
| 5,471,575 A | 11/1995 | Giansante |
| 5,481,667 A | 1/1996 | Bieniek et al. |
| 5,483,632 A | 1/1996 | Kuwamoto et al. |
| 5,499,330 A | 3/1996 | Lucas et al. |
| 5,504,674 A | 4/1996 | Chen et al. |
| 5,504,675 A | 4/1996 | Cragun et al. |
| 5,517,405 A | 5/1996 | McAndrew et al. |
| 5,523,942 A | 6/1996 | Tyler et al. |
| 5,535,323 A | 7/1996 | Miller et al. |
| 5,537,315 A | 7/1996 | Mitcham |
| 5,550,734 A | 8/1996 | Tarter et al. |
| 5,550,976 A | 8/1996 | Henderson et al. |
| 5,557,515 A | 9/1996 | Abbruzzese et al. |
| 5,586,310 A | 12/1996 | Sharman |
| 5,613,072 A | 3/1997 | Hammond et al. |
| 5,638,508 A | 6/1997 | Kanai et al. |
| 5,644,778 A | 7/1997 | Burks et al. |
| 5,652,842 A | 7/1997 | Siegrist, Jr. et al. |
| 5,655,085 A | 8/1997 | Ryan et al. |
| 5,673,402 A | 9/1997 | Ryan et al. |
| 5,689,706 A | 11/1997 | Rao et al. |
| 5,704,044 A | 12/1997 | Tarter et al. |
| 5,717,913 A | 2/1998 | Driscoll |
| 5,732,221 A | 3/1998 | Feldon et al. |
| 5,732,397 A | 3/1998 | DeTore et al. |
| 5,745,901 A | 4/1998 | Entner et al. |
| 5,748,953 A | 5/1998 | Mizutani et al. |
| 5,768,505 A | 6/1998 | Gilchrist et al. |
| 5,768,506 A | 6/1998 | Randell |
| 5,768,578 A | 6/1998 | Kirk et al. |
| 5,797,134 A | 8/1998 | McMillan et al. |
| 5,832,481 A | 11/1998 | Sheffield |
| 5,832,530 A | 11/1998 | Paknad et al. |
| 5,835,897 A | 11/1998 | Dang |
| 5,835,914 A | 11/1998 | Brim |
| 5,850,442 A | 12/1998 | Muftic |
| 5,870,711 A | 2/1999 | Huffman |
| 5,873,066 A * | 2/1999 | Underwood et al. ........ 705/4 |
| 5,884,274 A | 3/1999 | Walker et al. |
| 5,895,461 A | 4/1999 | De La Huerga et al. |
| 5,899,998 A | 5/1999 | McGauley et al. |
| 5,903,873 A | 5/1999 | Peterson et al. |
| 5,907,848 A | 5/1999 | Zaiken et al. |
| 5,909,683 A | 6/1999 | Miginiac et al. |
| 5,913,198 A | 6/1999 | Banks |
| 5,915,241 A | 6/1999 | Giannini |
| 5,918,208 A | 6/1999 | Javitt |
| 5,930,759 A | 7/1999 | Moore et al. |
| 5,933,816 A | 8/1999 | Zeanah et al. |
| 5,937,189 A | 8/1999 | Branson et al. |
| 5,946,694 A * | 8/1999 | Copeland et al. ........... 707/103 |
| 5,950,169 A | 9/1999 | Borghesi et al. ............ 705/4 |
| 5,950,196 A | 9/1999 | Pyreddy et al. |
| 5,956,691 A | 9/1999 | Powers |
| 5,970,464 A | 10/1999 | Apte et al. |
| 5,987,434 A | 11/1999 | Libman |
| 5,991,733 A | 11/1999 | Aleia et al. |
| 5,991,756 A | 11/1999 | Wu |
| 5,995,947 A | 11/1999 | Fraser et al. |
| 5,999,940 A | 12/1999 | Ranger |
| 6,012,053 A | 1/2000 | Pant et al. |
| 6,016,504 A | 1/2000 | Arnold et al. |
| 6,029,150 A | 2/2000 | Kravitz |
| 6,029,195 A | 2/2000 | Herz |
| 6,038,393 A | 3/2000 | Iyengar et al. |
| 6,038,668 A | 3/2000 | Chipman et al. |
| 6,049,665 A | 4/2000 | Branson et al. |
| 6,049,773 A | 4/2000 | McCormack et al. ........ 705/4 |
| 6,061,657 A | 5/2000 | Whiting-O'Keefe |
| 6,064,983 A | 5/2000 | Koehler |
| 6,065,000 A | 5/2000 | Jensen |
| 6,065,047 A | 5/2000 | Carpenter et al. |
| 6,073,104 A | 6/2000 | Field |
| 6,081,832 A | 6/2000 | Gilchrist et al. |
| 6,088,710 A | 7/2000 | Dreyer et al. |
| 6,092,049 A | 7/2000 | Chislenko et al. |
| 6,098,070 A | 8/2000 | Maxwell |
| 6,105,007 A | 8/2000 | Norris |
| 6,112,986 A | 9/2000 | Berger et al. |
| 6,115,690 A | 9/2000 | Wong |
| 6,119,093 A | 9/2000 | Walker et al. |
| 6,128,598 A | 10/2000 | Walker et al. |
| 6,134,582 A | 10/2000 | Kennedy |
| 6,148,297 A | 11/2000 | Swor et al. |
| 6,163,770 A | 12/2000 | Gamble et al. |
| 6,185,540 B1 | 2/2001 | Schreitmueller et al. |
| 6,202,054 B1 | 3/2001 | Lawlor et al. |
| 6,208,973 B1 | 3/2001 | Boyer et al. |
| 6,226,623 B1 | 5/2001 | Schein et al. |
| 6,236,972 B1 | 5/2001 | Shkedy |
| 6,236,975 B1 | 5/2001 | Boe et al. |
| 6,237,035 B1 | 5/2001 | Himmel et al. |
| 6,239,798 B1 | 5/2001 | Ludolph et al. |
| 6,266,645 B1 | 7/2001 | Simpson |
| 6,272,471 B1 | 8/2001 | Segal |
| 6,272,482 B1 | 8/2001 | McKee et al. |
| 6,272,528 B1 | 8/2001 | Cullen et al. |
| 6,330,551 B1 | 12/2001 | Burchetta et al. |
| 6,336,096 B1 | 1/2002 | Jernberg |
| 6,341,265 B1 | 1/2002 | Provost et al. |
| 6,343,271 B1 | 1/2002 | Peterson et al. |
| 6,370,511 B1 | 4/2002 | Dang |
| 6,401,079 B1 | 6/2002 | Kahn et al. |
| 6,456,303 B1 | 9/2002 | Walden et al. |
| 6,477,533 B2 | 11/2002 | Schiff et al. |
| 6,480,956 B1 | 11/2002 | DiRienzo |
| 6,484,178 B1 | 11/2002 | Bence, Jr. et al. |
| 6,594,635 B1 * | 7/2003 | Erlanger ............... 705/4 |
| 2002/0116228 A1 | 8/2002 | Bauer et al. |

FOREIGN PATENT DOCUMENTS

| | | |
|---|---|---|
| EP | 0 465 018 | 1/1992 |
| EP | 0 926 608 | 6/1999 |

OTHER PUBLICATIONS

Lauristen, Knowing Documents, 1993, Proceedings of the 4th International Conference on Artificial Intelligence and Law, pp. 184-191.*

American Insurance Group, Form 10-K, SEC Accession No. 0000950123-93-002720, Mar. 28, 1997, pp. 1-5 and 48-49.*

U.S. Appl. No. 09/675,380.

U.S. Appl. No. 09/675,379.

"@ Fault A Commitment to Consistency," Computer Sciences Corporation, Copyright 2000, pp. 1-2.

Banking Flows Onto Net, Two Austin Software Companies Poised for Boom in Online Service; Ladendorf, Kirk; Dec. 14, 1998; pp. 1-5; Austin American Statesman.

"High-Performance Communication Networks"; Jean Walrand and Pravin Varaiya; 1996; pp. 361-369; Morgan Kaufmann Publishers.

"InsWeb Teams Up with Online Resources; Deal brings online insurance Marketplace to hundreds of financial institutions"; Dec. 2, 1998; pp. 1-3; Business Wire.

"Reliance Group providing On-Line Access to Workers' Comp, Auto, Surety, Professional Liability Coverages; E-Commerce to Exceed $100 Million in 1999"; Dec. 7, 1998; pp. 1-3; Business Wire.

"Time and Billing Gets Webbed"; Antoinette, Alexander; Jun. 1, 2000; pp. 46-50; Accounting Technology vol. 16 No. 5.

"Will your Business Model Float!"; Baatz, E.B.; Webmaster Magazine; Oct. 1996; http://www.cio.com/archive/webbusiness/100196_float_content.html.

Borland, Russel; "Running Microsoft Outlook 97," Microsoft Press, 1997.

Howarth, "Outsourcing: Technology on Tap," Business Review Weekly, Dec. 1999, pp. 1-5.

"The OTC Revolution"; Juhl, Randy; Mar. 3, 1997; Drug Topics 141 (5).

Mead, Jay, "Measuring the Value Added by Technical Documentation" Technical Communication Online, Aug. 1998, V. 45, N. 3.

Medisoft Insurance Claims Software Website. May 10, 2000. [Retrieved on Jan. 10, 2003] Retrieved from Interne URL: <http://web.archive.org/web/20000510094549/http://www.medisoft.com/>.

Merlin, Jr., William F., "Collision Course With the Colossus Program: How To Deal With It," The Merlin Law Group, May 2000, Tampa, FL, pp. 1-17.

Merlin, Jr., William F., "Overcoming Allstate's Trade Secrets and Work-Product Objections," The Merlin Law Group, May 200, Tampa, FL, pp. 1-31.

Microsoft Corporation, "Holding State in Objects with Microsoft Transaction Server," Jun. 1997, pp. 1-3.

Microsoft Corporation, "Microsoft Component Services, Server Operating System, A Technology Overview," Aug. 15, 1998, pp. 1-7.

Microsoft Press Computer Dictionary Second Edition, Microsoft Press, 1994, pp. 26-27, 117, 277, 335, 338, 353, 366-367, and 383.

Scopus and Entrust Technologies to Deliver World's First Secure Customer Care Solution for the Financial Services Market; PR Newswire dated Nov. 5, 1997.

Utzschneider, "Microsoft Transaction Server and Internet Information Server: Technology for the Web," Feb. 6, 1998, pp. 1-6.

Merlin, Jr., William F., "Colossus: What We Know Today," The Merlin Law Group, Aug. 2000, Tampa, FL, pp. 1-8.

https://www.foremost.com/secure/fm_claims.htm 1996.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 16 pages.

Continuum Connections, Vol. II, No. 2, The Continuum Company, Inc., Dec./Jan. 1993, 24 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 16 pages.

Continuum Connections to the Americas, vol. I, No. 1, The Continuum Company, Inc., Sep. 1995, 49 pages.

Continuum Connections, vol. III, No. 4, The Continuum Company, Inc., Oct./Nov. 1995, 24 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 59 pages.

Continuum Connections to the Americas, vol. 2, No. 3, The Continuum Company, Inc., May 1996, 51 pages.

Continuum Connections to the Americas, vol. 2, No. 4, The Continuum Company, Inc., Jul. 1996, 55 pages.

Continuum Connections to the Americas, vol. 2, No. 5, The Continuum Company, Inc., Sep. 1996, 59 pages.

Connections to the Americas, vol. 3, No. 1, CSC Continuum, Jan. 1997, 55 pages.

Connections to the Americas, vol. 3, No. 2, CSC Continuum, Feb. 1997, 55 pages.

Connections to the Americas, vol. 3, No. 3, CSC Continuum, Mar. 1997, 48 pages.

Connections to the Americas, vol. 3, No. 4, CSC Continuum, Apr. 1997, 40 pages.

Connections to the Americas, vol. 3, No. 5, Computer Sciences Corporation, May/Jun. 1997, 66 pages.

Connections to the Americas, vol. 3, No. 6, Computer Sciences Corporation, Jul./ Aug. 1997, 56 pages.

Connections to the Americas, vol. 3, No. 7, Computer Sciences Corporation, Sep./ Oct. 1997, 76 pages.

Connections to the Americas, vol. 4, No. 1, Computer Sciences Corporation, Jan. 1998, 64 pages.

Connections to the Americas, vol. 4, No. 2, Computer Sciences Corporation, Feb./Mar. 1998, 50 pages.

Connections to the Americas, vol. 4, No. 3, Computer Sciences Corporation, May/Jun. 1998, 48 pages.

Connections to the Americas, vol. 4, No. 4, Computer Sciences Corporation, Sep./ Oct. 1998, 62 pages.

Insurance Connections, Computer Sciences Corporation, Feb./Mar. 1999, 52 pages.

Banking Connections, Computer Sciences Corporation, Apr./May 1999, 44 pages.

Insurance Connections, Computer Sciences Corporation, Jun./Jul. 1999, 56 pages.

Banking Connections, Computer Sciences Corporation, Aug./ Sep. 1999, 52 pages.

Insurance Connections, Computer Sciences Corporation, Oct./Nov. 1999, 56 pages.

Cost Containment: Products and Solutions for the Property and Casualty Insurance Industry, Computer Sciences Corporation, Oct. 1999, 40 pages.

Banking Connections, Computer Sciences Corporation, Dec. 1999, 48 pages.

Insurance Connections, Computer Sciences Corporation, Feb./Mar. 2000, 60 pages.

Banking Connections, Computer Sciences Corporation, Apr./May 2000, 48 pages.

Insurance Connections, Computer Sciences Corporation, Jun./Jul. 2000, 43 pages.

Insurance Connections, Computer Sciences Corporation, Sep./Oct. 2000, 43 pages.

Banking Connections, Computer Sciences Corporation, Nov./Dec. 2000, 48 pages.

International search report application No. PCT/US00/26695 mailed May 19, 2003.

* cited by examiner

CONDITION COMPONENT FRAMEWORK FOR REINSURANCE

PRIORITY CLAIM

This application claims the benefit of U.S. Provisional Application No. 60/157,223 entitled "CONDITION COMPONENT FRAMEWORK FOR REINSURANCE," filed Sep. 30, 1999.

BACKGROUND OF THE INVENTION

1. Field of the Invention

The present invention generally relates to computer software. More particularly, the present invention relates to the customization of conditions of a business contract.

2. Description of the Related Art

Financial services organizations have come to rely on complex software systems to administer their businesses. Financial service organizations may include, for example, reinsurance organizations. Reinsurance may include the transfer by a first insurer of all or part of a risk to a second insurer to provide protection against the risk, as well as any associated transactions. In other words, reinsurance can be thought of as "insurance for insurance companies." When catastrophic events such as earthquakes, floods, tornadoes, hurricanes, airline accidents, etc. occur the insured often file for damage claims to reduce the impact of the loss of property and/or life. The insurance companies, which offer policies to cover for such catastrophic losses, come under severe financial strain to absorb the losses and still maintain the required surplus. The surplus is an insurance company's net worth, i.e. its assets minus its liabilities. Some insurance companies may deplete their surplus too far to be unable to fulfill their obligations to their policyholders. To protect policyholders against insolvency of an insurance company, government regulations may require insurance companies to maintain a minimum surplus. The size of an insurance companies surplus is thus considered as an important factor to rate insurance companies. To maintain a surplus and protect against insolvency insurance companies may purchase their own insurance policies, i.e. reinsurance policies.

An insurance company, also known as primary or ceding company, may purchase a reinsurance policy from a reinsurance company, also known as reinsurer, in much the same way that direct or primary insurance is purchased. The primary or the first insurer may also be called a cedent, and the secondary or the second insurer may be called a reinsurer. Reinsurance organizations may include cedents, reinsurers, and any other entities involved in reinsurance transactions. Reinsurance may protect a cedent against catastrophes and cumulative losses and also enable it to accept risks that exceed its own underwriting capacity.

The complexity of the reinsurance field tends to require software for reinsurance administration to be complex as well. Generally speaking, software for reinsurance administration may be expected to handle risk selection, portfolio analysis, policy administration, claims, accounting, and other areas vital to the reinsurance field. Reinsurance profits may depend on analysis of historical information, the ability to predict trends, and the ability to identify cumulative exposures within a current portfolio, and reinsurance software may therefore be expected to meet requirements relating to those functions. Consequently, the development of a software system for reinsurance administration to meet the above-identified needs may require great time and expense.

In a changing reinsurance market, a reinsurance company may quickly fall behind its competitors. For example, as reinsurers begin taking on direct risks, the market may demand integrated solutions. Some reinsurance computer systems may not be able to easily and quickly migrate the graphical user interfaces from a text based display to a color, graphical display. Some reinsurance computer systems may be unable to modify and customize the condition component of a reinsurance contract, such as adjustment of an insurance period, changing premium limits, etc. promptly in response to a customer requirement. A reinsurer may need to move quickly against competitors to meet the changing needs of the market or to revitalize a reinsurance product line. Therefore, it would be advantageous for a reinsurer to reduce the time, expense, and risk associated with a complex product development effort that may require more than one hundred person-years of development time. Even during development, technical and functional requirements may evolve as dozens of potential customers instruct the reinsurer of their customized needs. It would be further advantageous for a reinsurer to have a flexible development process that can meet evolving customer requirements in the middle of a development effort.

Utilization of object-oriented software design techniques is one approach towards reducing development time. Object-oriented software design may include the use of objects and classes. An object may include an encapsulation of data and methods for manipulating the data. A class may include a template for an object. An object is therefore an instance of a class, and an object is created by instantiating it from a class. Object-oriented techniques, when used properly, may permit the re-use of previously written program code such as classes. The use of development frameworks is a related approach towards reducing development time. As used herein, a "framework" may include a set of classes or templates that embodies an abstract design for solutions to a number of related problems. Frameworks may be employed with object-oriented techniques to include flexible, customizable condition component of a reinsurance business contract. Frameworks may also include a flexible object-oriented graphical user interface software to process reinsurance transactions.

Therefore, there is a need for a system and method for developing improved flexible and customizable condition component of a reinsurance business contract. It is also desirable to develop graphical user interface software for processing reinsurance business transactions with decreased development time and increased flexibility.

SUMMARY OF THE INVENTION

The present invention provides various embodiments of an improved method and system for developing improved flexible and customizable condition component of a reinsurance business contract. The method and system may be used by reinsurers to build an improved flexible, customized condition component associated with a reinsurance contract with increased re-use of existing functionality and decreased development time. A business process framework may include common functionality, e.g. a GUI for a plurality of business processes. The business process framework may include a template for executing the business processes. In one embodiment, the method may include deriving one or more business processes from the business process framework. One or more business process subclasses may be derived from one or more abstract business process classes, wherein the business process framework includes the one or more abstract business process classes. At run-time during the execution of the reinsurance administration system, the business process objects may be instantiated as instances of the one or more business process subclasses. The method may further include combining the business process subclasses to build one or more application programs, such as application programs for reinsurance transaction processing. In one embodiment, a first business process subclass may be configured to invoke a second business process subclass.

The business process framework may include a plurality of support processes. The method may further include identifying one or more of the support processes for each of the business process subclasses. The support processes may include, for example, support processes for data validation, support processes for performing syntax validation, support processes for security checks, support processes for graphical user interface elements, and support processes for persistent data storage, and/or support processes for performing precondition checks. In one embodiment, identifying one or more of the support processes for each of the business process subclasses may include overriding one or more of hook methods for each of the business process subclasses.

The business process framework may include a plurality of hook methods. The hook methods may permit the developer to access points during the execution of the business process. By overriding the hook methods at various points, the developer may identify methods to be performed at various points during execution of the business process. Overriding one or more of the hook methods for each of the business processes may include replacing one or more of the hook methods inherited from an abstract business process class with one or more new methods. The hook methods may include, for example, methods to be executed during initialization of the business process, methods to be executed prior to execution of a data entry support process, methods to be executed during execution of data entry without a user interface, methods to be executed prior to execution of a database commit support process, and/or methods to be executed prior to execution of a database rollback support process. As will be apparent to one skilled in the art, many more hook methods may be employed in developing a business process.

The common functionality of the business process framework may include an order for executing steps in a business process. The steps in the business process may include pre-execution, data entry, data validation, pre-commit to a database, commit to the database, and post-commit to the database. The common functionality of the business process framework may include behavior for buttons in a graphical user interface, formatting and displaying windows in a graphical user interface, methods or variables of the abstract business process classes which are inherited by the business process subclasses, logging and displaying error messages, committing changes to a database, and/or rolling back changes to a database.

An object-oriented, multi-dimensional reinsurance contract framework may represent a reinsurance contract. The multi-dimensional reinsurance contract framework may permit the handling of various dimensions of a reinsurance contract such as handling different versions of the reinsurance contract (e.g., yearly periods), handling multi-level specialization hierarchy (e.g., different conditions for different sections of the reinsurance contract, handling the change of conditions within a period, and processing inheritance of contract structure and conditions from an abstract or master reissue contract. The multi-dimensional reinsurance contract framework may capture the various dimensions and hide the multi-dimensionality from subsequent domain modeling and the design of additional reinsurance contract components. The framework may also encapsulate business rules for managing the various dimensions into an abstract framework.

An object-oriented condition component framework may represent the condition component or dimension of a reinsurance contract. The condition component framework may permit the addition and/or modification of one or more conditions included in the condition component of the reinsurance contract. These conditions may comprise, for example, configuring or changing the premium limits, consolidation conditions, and other conditions for a reinsurance contract. The condition component may be implemented as reusable objects.

The business process framework may also include an object-oriented graphical user interface software. The graphical user interface may include a plurality of displays, along with a navigational tool to enable users to navigate through a hierarchy of displays related to reinsurance transaction processing. Each display may be defined as an object. A display may include one or more windows and the navigational tool. The one or more windows and the navigational tool may be displayed in a tiled, non-overlapping manner. The navigational tool may include one or more tool panels. The navigational tool may also include one or more user interface items such as icons and buttons to enable the user in navigating through the hierarchy of displays. Each user interface item included in the navigational tool may be configured to perform a particular action such as calling a particular display on receiving a user input. The user may process a reinsurance business transaction by accessing the hierarchy of displays with the navigational tool integrated with the business process framework.

Figure 1:
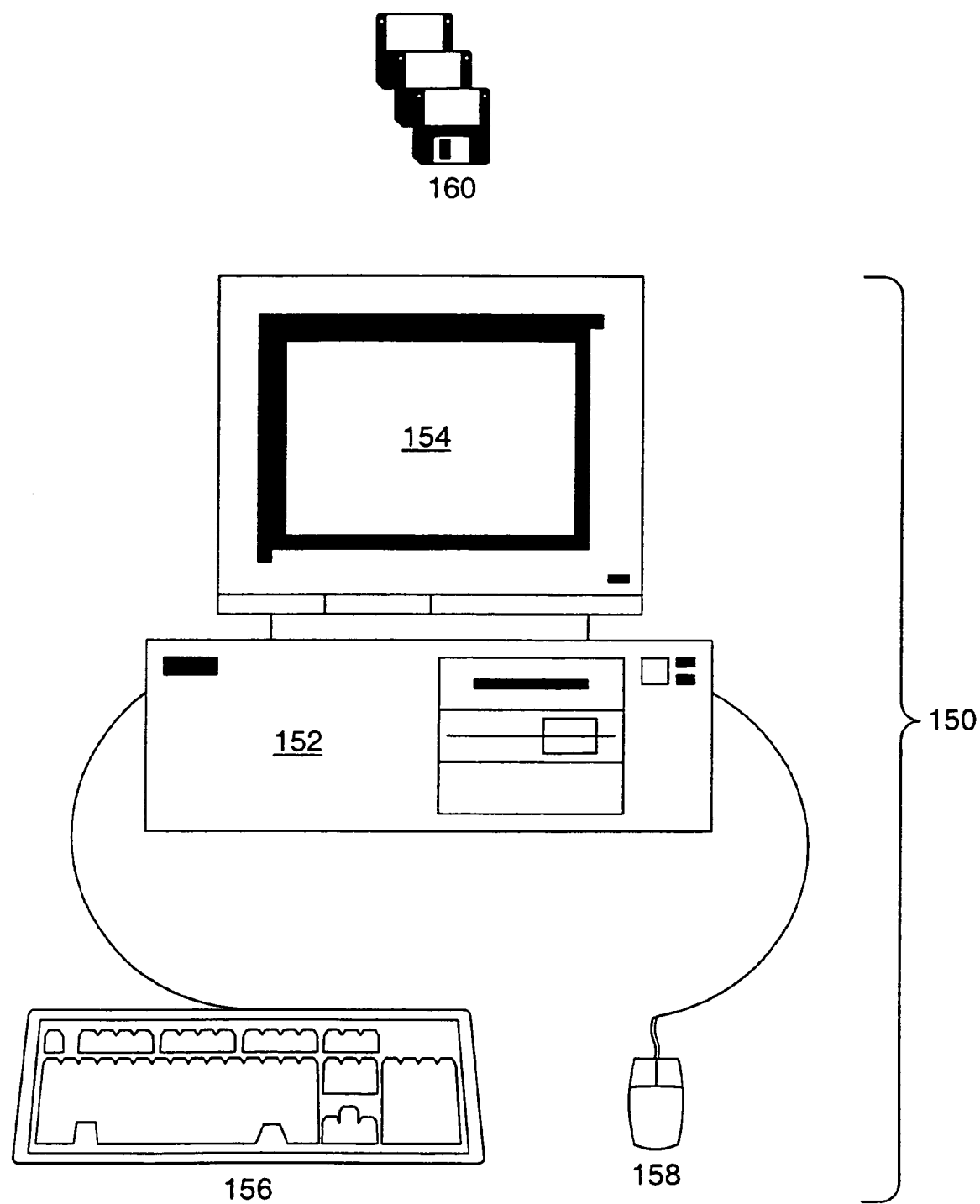
FIG. 1 is an illustration of a typical computer system which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

FIG. 1: A Typical Computer System

FIG. 1 illustrates a typical computer system 150, which is suitable for implementing various embodiments. Each computer system 150 typically includes components such as a CPU 152 with an associated memory medium such as floppy disks 160. The memory medium may store program instructions for computer programs, wherein the program instructions are executable by the CPU 152. The computer system 150 may further include a display device such as a monitor 154, an alphanumeric input device such as a keyboard 156, and a directional input device such as a mouse 158. The computer system 150 is operable to execute the computer programs to implement the system and method for developing a reinsurance transaction processing system, also referred to as the reinsurance administration system, as described herein. As described herein, one embodiment of the typical the computer system 150 may be a reinsurance transaction processing system 150.

The computer system 150 preferably includes a memory medium on which computer programs according to various embodiments may be stored. The term "memory medium" may include an installation medium, e.g., a CD-ROM, or floppy disks 160, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer, which connects to the first computer over a network (not shown). In the latter instance, the second computer provides the program instructions to the first computer for execution. Also, the computer system 150 may take various forms, including a personal computer system, mainframe computer system, workstation, network appliance, Internet appliance, personal digital assistant (PDA), television system or other device. In general, the term "computer system" 150 can be broadly defined to encompass any device having a processor 152, which executes instructions from a memory medium.

The memory medium preferably stores software programs for reinsurance administration and/or software programs for developing a reinsurance administration system as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU 152, executing code and data from the memory medium includes a means for creating and executing the software program or programs according to the methods and/or block diagrams described below.

In FIG. 1, an embodiment of a reinsurance transaction processing system may include a computer system 150. The term "computer system" as used herein generally includes the hardware and software components that in combination allow the execution of computer programs. The computer programs may be implemented in software, hardware, or a combination of software and hardware. A computer system's hardware generally includes a processor (CPU 152), memory media, and Input/Output (I/O) devices. As used herein, the term "processor" generally describes the logic circuitry that responds to and processes the basic instructions that operate a computer system.

A computer system's 150 software generally includes at least one operating system such as Windows NT, which is available from the Microsoft Corporation. The operating system is a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory, such as floppy disks 160, or on an installation medium. A program may be copied into a volatile memory when running on the computer system 150. Data may be read into volatile memory as required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems. A server that may be used to process reinsurance transactions is the SICS system. The SICS system is supplied by Computer Sciences Corporation.

As used herein, the term "channel" generally describes any pathway that allows a user to interface with a computer system. Channels may include, but are not limited to, main office entry systems, branch office entry systems, kiosks, call centers, Internet systems, and electronic data interchange (EDI) systems. A channel may be a computer system. For example, the computer system 150 shown in FIG. 1 may be a channel used for a reinsurance office data entry system, a branch office entry system, a client computer system with a web browser or a component of the system used in a call center channel.

Each type of channel may require different implementation systems. For example, a kiosk entry system may use a touch-oriented visual screen. Special programming implementations may be needed to transfer data from the kiosk to the computer system. A channel may be implemented so that the channel may only be used for selected types of business transactions. A kiosk system may be set up to only process certain business transactions, such as providing pricing quotes for specified reinsurance coverage situations. An office data entry system may use a monitor 154, keyboard 156 and pointing device 158 (mouse) to allow for data entry into a computer system 150. A call center typically involves the oral communication of data to a person who enters the data into a computer system through a keyboard 156 and/or pointing device 158. Electronic data entry systems may transfer data from one computer system to another.

The reinsurance transaction processing system 150 may further include a display screen 154 connected to the computer system 150 and a reinsurance database (not shown) residing on an internal or external storage. The database may also be referred to as a repository. As used herein, a "database" may include a collection of information from which a computer program may select a desired piece of data. As used herein, a "reinsurance database" is used as a synonym for a "database" when included in or coupled to a reinsurance transaction processing system 150. Reinsurance transaction processing program, also referred to as application program software, may be stored in memory. As used herein, a "reinsurance transaction processing program", also referred to as a reinsurance program or reinsurance software, may include a software program which is configured to execute reinsurance transactions, such as by estimating the value of the reinsurance premium, for example.

The reinsurance transaction processing system 150 may be used by a Reinsurance Company (RC) for various embodiments of a system and method for processing reinsurance transactions. As used herein, a reinsurance Company (RC) includes a business organization that provides reinsurance products and/or services to customers. More particularly, the reinsurance products may pertain to estimating premiums, damages, etc. For example, estimating a reinsurance premium for a reinsurance policy, providing an estimate for a reinsurance claim filed for property and casualty damage.

In one embodiment, on incurring property damage to its policyholders, a primary insurance company may file a reinsurance claim (RC) with their reinsurance organization to cover loss of property. A RC may utilize a computer-based reinsurance claim processing system to process reinsurance claim. In one embodiment, the transaction processing may include estimating a value associated with the filed reinsurance claim.

As used herein, an RC business transaction may be defined as a service of an RC. Examples of business transactions include, but are not limited to, reinsurance transactions such as: filing of reinsurance claims, application for additional reinsurance coverage, payment of premiums, application for new reinsurance coverage, and customized benefits, etc. For a reinsurance provider, examples of business transactions may include, but are not limited to, adding or deleting primary insurance companies, tracking payables and receivables, establishing new policies/contracts, renewing policies/contracts, changing policies/contracts, canceling policies/contracts, providing pricing quotes for policies, and processing claims based on policies. Business transactions may also include services related to customers, reinsurance providers, employers, reinsurance agents, investigators, regulatory agencies, etc.

As used herein, an RC reinsurance transaction processing includes a series of instructions executed by a computer system 150 for processing an RC's business transactions. An RC transaction processing system 150 may include one or more processing tasks. A processing task may include a sequence of one or more processing steps or an ordered list or a structured list of one or more processing steps, associated with the business transaction to be processed by the RC transaction processing system. In one embodiment, the sequence of steps may be fixed. In another embodiment the sequence of steps may be established dynamically, in real-time. In one embodiment, the sequence of one or more steps may include an initial step, a final step, one or more intermediary steps, etc. In one embodiment, an RC user may select steps to process a reinsurance claim in a sequential manner. In another embodiment, the RC user may select steps to process a reinsurance claim in a random or arbitrary manner. Examples of processing steps may include, but are not limited to: receiving an input from a user of the RC reinsurance transaction processing system, reading a value from a database, updating a field in a database, displaying the results of a business transaction on a computer screen 154, etc.

In one embodiment, the reinsurance transaction processing system utilizes object-oriented technology to process reinsurance transaction. In another embodiment, processing of reinsurance transaction may utilize traditional programming languages and databases to achieve the same result. Reinsurance objects may be defined to represent or model real-world business features of reinsurance products and services. Examples of reinsurance objects may include, but are not limited to, objects representing the following: a reinsurance claim; an accident report; a settlement; an estimated claim; RC service facilities, customers, and employees; business process such as a new reinsurance application and calculation of a premium; interfaces to external reinsurance organizations; work tasks such as calculations, decisions, and assignments; temporal objects such as calendars, schedulers, and timers; and elemental data necessary to accomplish work tasks such as medical costs, risk factors, automobile repair costs, etc.

A reinsurance object may be represented on the computer screen 154 by a graphical icon or by a display listing the properties of the reinsurance object in graphic and/or alphanumeric format. In one embodiment, a reinsurance claim object may be configured to gather and evaluate data for processing a filed reinsurance claim and to automatically make decisions about the reinsurance claim. The one or more processing steps associated with the processing of a reinsurance claim may also be configured as one or more processing step objects. In one embodiment, a display screen 154, which also may be referred to as a page or a display, may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing reinsurance transaction. In one embodiment, the starting point for processing a reinsurance transaction may include acquiring a reinsurance claim number or a reinsurance policy identification number from an RC system user.

In one embodiment, during the processing of a reinsurance claim, a business rule and/or an RC system user input may determine that the reinsurance claim processing needs the execution of additional steps or tasks to continue the processing of the claim. The RC system user may provide inputs to the reinsurance transaction-processing program at any display screen 154 associated with a step included in the initial screen. The reinsurance claim processing software may dynamically modify the number of steps and/or the sequence of their execution to complete the claim processing transaction. An RC system user working at a client system may then iterate through the claim processing steps and arrive at an estimated value for the reinsurance claim.

In one embodiment, upon startup, the program may provide a graphical user interface (GUI) to display transaction processing related information on display screen 154. It may collect user inputs, entered by using user input devices 156 or 158, and associated with a reinsurance transaction. It may process the user inputs, access a reinsurance database 40, use the contents of the reinsurance database to estimate the reinsurance claim or premium, and store it in memory and/or reinsurance database. The program may display a value of the estimated reinsurance claim or premium on display screen 154. A user may view the display of the estimated reinsurance claim or premium on display screen 154, and may interactively make modifications, additions, and deletions to the estimated reinsurance claim or premium.

Computer system 150 may also include one or more user input devices, such as a keyboard 156, for entering data and commands into the reinsurance transaction-processing program. It may also include one or more cursor control devices 158 such as a mouse for using a cursor to modify a reinsurance claim viewed on display screen 154. In response to the updating of the estimated reinsurance claim, the reinsurance transaction-processing program may store the updated reinsurance claim in the reinsurance database.

In one embodiment, the rule definitions, object properties, transaction values, etc. may be constructed and stored during the configuration of the RC system 150. Configuration of the RC system 150 may occur at the time the RC system software program(s) and database(s) are initially installed and set up for processing RC transactions. Configuration of the RC system 150 may also occur after the initial configuration, which may be performed during the installation of the RC system. A configuration of the RC system that occurs after the initial configuration may be called a reconfiguration of the RC system. During reconfiguration, the rule definitions, object properties, transaction values, etc. defined or configured during the initial configuration may be modified or deleted, and new rule definitions, object properties, transaction values, etc. may be added to the RC system 10. Some data may be processed differently in the RC system after a reconfiguration of the RC system than before the reconfiguration. For example, a business rule may be defined using a different rule structure after a reconfiguration. Thus the resulting algorithm computation returned to a calling program may be different than before the reconfiguration.

In one embodiment, the reinsurance transaction processing system may provide context-sensitive help for the processing steps. In one embodiment, the context-sensitive help for the step may be automatically invoked and displayed on display screen 154 when entering the step. In one embodiment, the user may interactively invoke context-sensitive help for the step by selecting one or more interface items on the display screen 154 with a cursor control device 158 such as a mouse. In one embodiment, the user may interactively invoke context-sensitive help for the step by using an input device 156. For example, the user may select one or more keys or a combination of keys on a keyboard to activate context-sensitive help. The context-sensitive help for each processing step may be unique, although content may appear in the context-sensitive help for two or more processing steps.

In one embodiment, information for the context sensitive help may be accessed from help database, included in database. Help database may include one or more one or more documents including information that may be useful to a user in performing the various processing steps associated with reinsurance transaction processing. Help database may also include one or more tables that provide access to the information in the documents. Each table may include a plurality of records or entries that may be used to locate help information about processing steps and/or the elements in processing steps in the one or more documents in the help database.

In one embodiment, a search interface may be provided in the reinsurance transaction processing system 150. A user may enter in the search interface one or more terms to be searched for in help database, included in database for the reinsurance transaction processing system 150. The user may then initiate the search for the one or more terms. The reinsurance transaction processing system may then search the help database for entries including at least one of the one or more terms. The reinsurance transaction processing system may locate one or more entries in the help database that include at least one of the one or more terms. The reinsurance transaction processing system may then display information on display screen 154 from the located help database entries.

Figure 2:
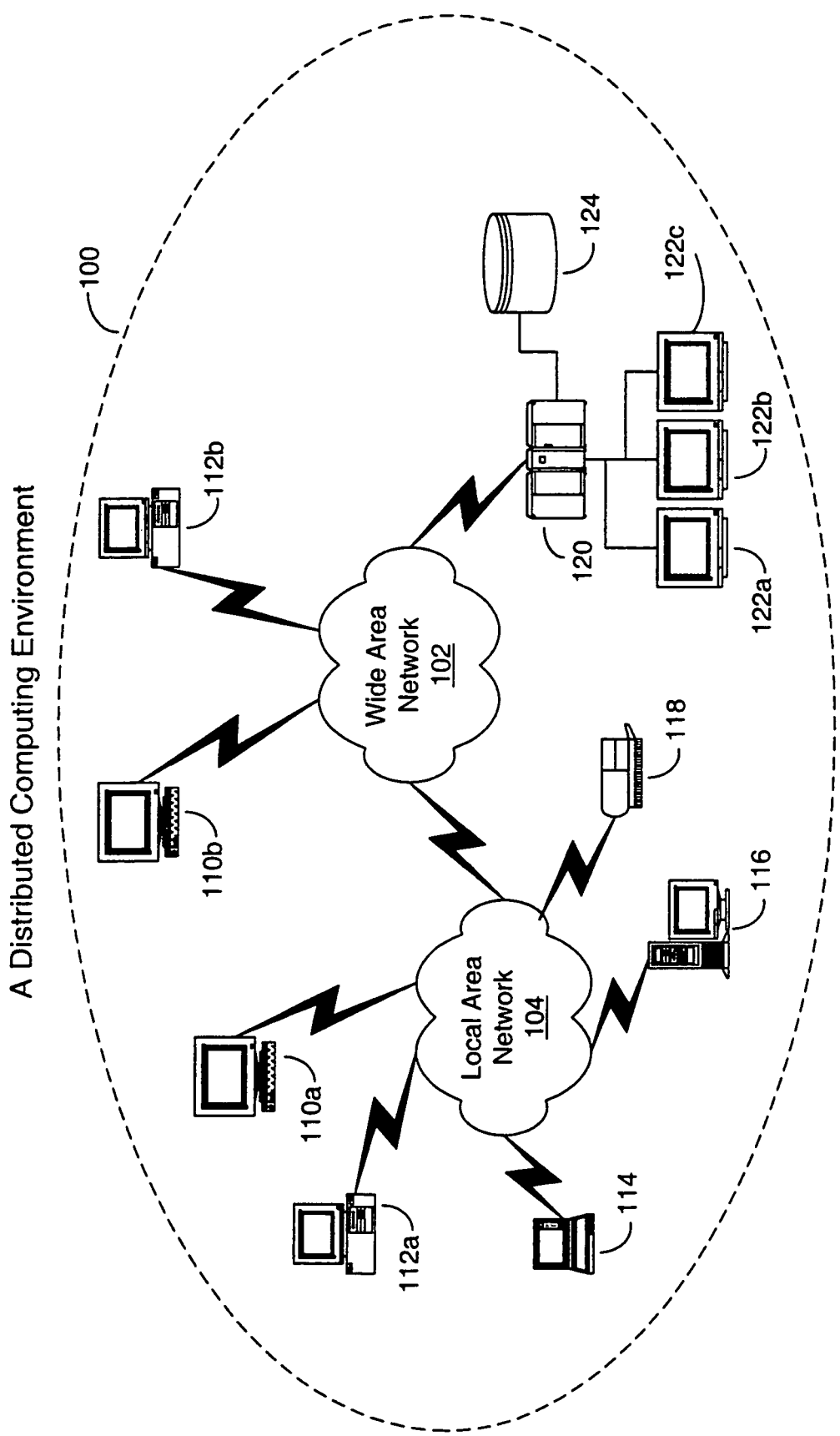
FIG. 2 is an illustration of a distributed computing environment which is suitable for implementing various embodiments.

FIG. 2: A Distributed Computing Environment

FIG. 2 illustrates a distributed or enterprise computing environment according to one embodiment. A distributed computer system or enterprise 100 may include a plurality of computer systems, which are interconnected through one or more networks. Although one particular embodiment is shown in FIG. 2, the distributed computer system 100 may include a variety of heterogeneous computer systems and networks which are interconnected in a variety of ways and which run a variety of software applications and/or operating system software.

One or more local area networks (LANs) 104 may be included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 2, the distributed computer system 100 may include one LAN 104. However, in alternate configurations the distributed computer system 100 may include a plurality of LANs 104 which are coupled to one another through a wide area network (WAN) 102. A WAN 102 is a network that spans a relatively large geographical area.

Each LAN 104 includes a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 2, an example LAN 104 may include one of each of computer systems 110a, 112a, 114, and 116, and one printer 118. The LAN 104 may be coupled to other computer systems and/or other devices and/or other LANs 104 through a WAN 102.

One or more mainframe computer systems 120 may be coupled to the distributed computer system 100. As shown in FIG. 2, the mainframe 120 may be coupled to the distributed computer system 100 through the WAN 102, but alternatively one or more mainframes 120 may be coupled to the distributed computer system 100 through one or more LANs 104. As shown, the mainframe 120 may be coupled to a storage device or file server 124 and mainframe terminals 122a, 122b, and 122c. The mainframe terminals 122a, 122b, and 122c may access data stored in the storage device or file server 124 coupled to or included in the mainframe computer system 120.

The distributed computer system 100 may also include one or more computer systems, which are connected to the distributed computer system 100 through the WAN 102: as illustrated, a workstation 110b and a personal computer 112b. In other words, the enterprise 100 may optionally include one or more computer systems, which are not coupled to the distributed computer system 100 through a LAN 104. For example, the distributed computer system 100 may include computer systems, which are geographically remote and connected to the distributed computer system 100 through the Internet.

In one embodiment, the enterprise or distributed computer system 100 includes one or more computer systems configured for reinsurance transaction processing and/or developing reinsurance administration systems. The one or more computer systems for reinsurance transaction processing systems may be typical computer systems 150 as illustrated in FIG. 1.

Figure 3A:
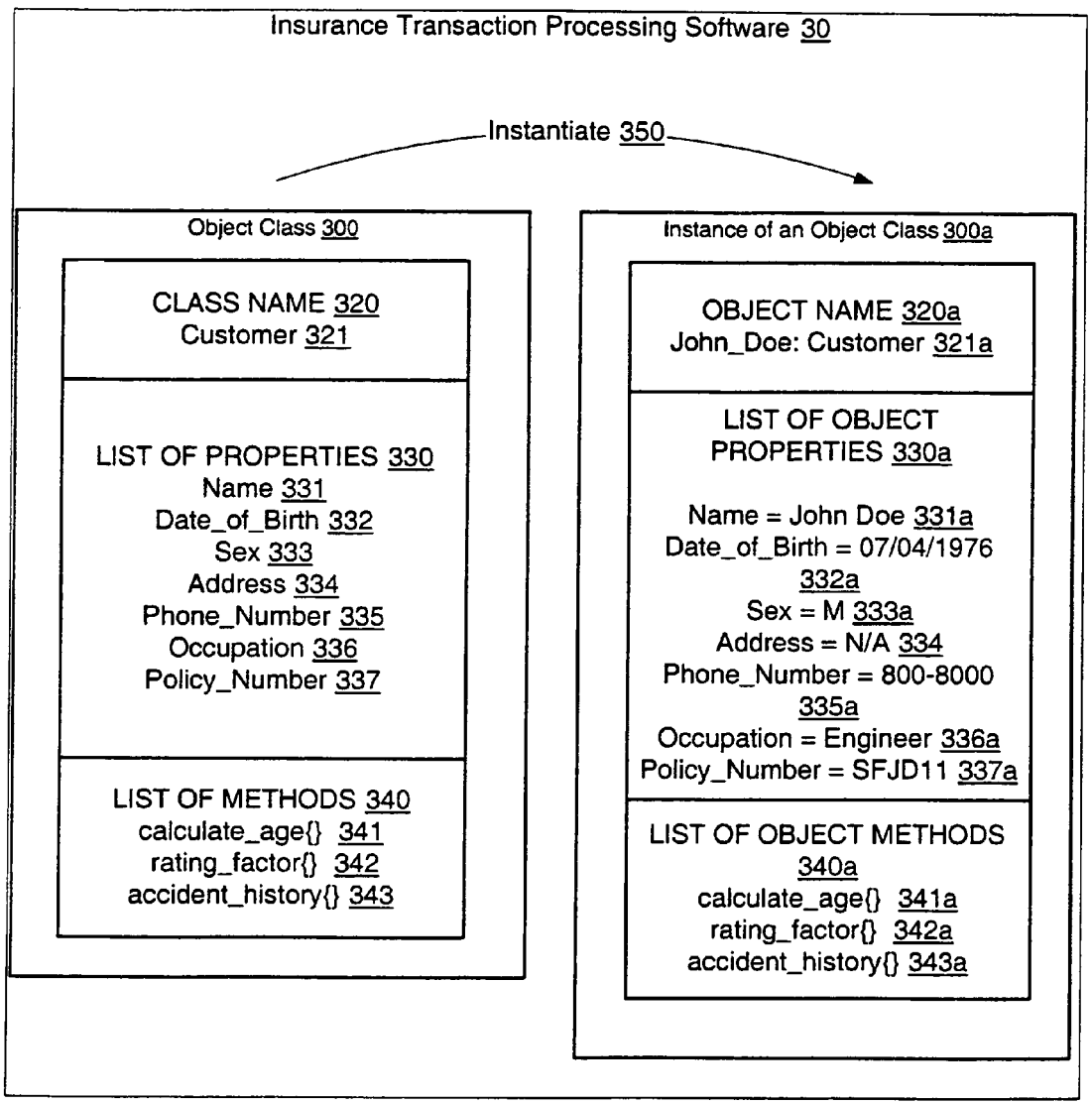
FIG. 3a is an illustration of reinsurance transaction processing software using object-oriented technology according to one embodiment.

FIG. 3a is One Embodiment of Reinsurance Transaction Processing Software Using Object-Oriented Technology The reinsurance software program may, in one embodiment, be implemented by using an object-oriented technology. The object-oriented technology may include, but not be limited to, an object-oriented analysis and design, an object-oriented language and an object-oriented repository or a database. In one embodiment, the reinsurance software program may be implemented by using a legacy programming language, such as C. The object-oriented programs may interact with legacy code programs, and vice versa, to process reinsurance transactions. In one embodiment, an object-oriented program may generate a new software module written in legacy code such as C.

Java™, Smalltalk and C++ are a few examples of object-oriented programming languages. In an object-oriented programming language, data and related methods can be grouped together or encapsulated to form an entity known as an object. The object is the fundamental building block of object-oriented programming. The data structures within an object may alternately be referred to as the object's state, its properties, its attributes, its fields, or its variables. In the Java™ Language, the data structures are normally referred to as the variables of the object. In the Smalltalk object-oriented programming language, the data structures may be normally referred to as the properties of the object. The procedures that operate on the variables are referred to in Java™ and Smalltalk as the methods of the object. The list of methods, associated with the object, may also be referred to as the list of operations. Unlike traditional programming, in object-oriented programming the operations on the variables may only be performed via the methods of the object. The properties and methods of an object may all be referred to as the members of the object. Examples of a few methods that may be used when associated with a reinsurance business object, may include but not be limited to: a method for creating (setting up) a new business (reinsurance policy), a method for renewing (new insurance period) a business, a method for registering a new claim against a business, a method for entering technical booking items (premium, claim, commission) against one or more business(es), a method for registering a remittance (payment) against a business partner, etc, etc.

In object-oriented programming, the grouping together of the properties and methods within an object is referred to as encapsulation. When the properties relating to an object and the methods that might affect the object are encapsulated within the object, other entities usually do not have direct access to these data and procedures. The other entities instead call on the object itself to invoke its own methods and thereby operate on its own data. The encapsulation of the members of the object thereby provides some protection for the data within the object and prevents unauthorized, unwanted, or unintended manipulation of the data. This is sometimes referred to as data hiding. (The concept of data hiding through encapsulation should be distinguished from the hiding of properties in Java™ variable declarations, as explained in more detail below.)

In the Java™ language, if a user wants to hide the data within an object, the variable that contains the data is made private. Private properties within an object may only be accessed by the methods of the object. Because it may, in some cases, be inconvenient or impractical to require manipulation of certain data through the methods of the associated object, some properties may be made public. These public properties are directly accessible to entities other than the object with which the properties are associated. Thus, in practice, the properties within objects normally include some that are hidden or inaccessible and some that are public.

In the Smalltalk language, properties are always private. However, one can achieve the effect of a public property by providing a so-called "getter" and "setter" method for this property. These methods then allow (indirect) access to the property from entities other than the object with which the property is associated.

All objects in an object-oriented programming system belong to a class, which can be thought of as a category of like objects, which describes the characteristics of those objects. Each object is created as an instance of the class by a program. The objects may therefore be said to have been instantiated from the class. The class sets out properties and methods for objects that belong to that class. The definition of the class does not itself create any objects. The class may define initial values for its properties, and the class normally defines the methods associated with the class (i.e., includes the program code which is executed when a method is invoked.) The class may thereby provide all of the program code that will be used by objects in the class, hence maximizing re-use of code, which is shared by objects in the class. FIG. 3a represents one embodiment of an reinsurance object class and an instance of the object class, where the software to create object classes and instances of an object class are included in the reinsurance transaction processing software 30. Illustrated in FIG. 3a, is one embodiment of a customer object class 300 and the creation of an instance 350 of the customer object class i.e., a customer object 300a. The customer class 300 may include a class identifier or a name 320, such as customer 321. The customer class 300 may also include one or more properties 330 such as name 331, date of birth 332, sex 333, address 334, phone number 335, occupation 336, policy number 337, etc. The customer class 300 may also include one or more methods 340 associated with the class 300 such as calculate_age 341, rating_factor 342, accident_history 343, etc. For example, the calculate_age method 341, when invoked, may calculate the current age of a customer. The method may return an argument containing the applicant's age. Creating an instance 350 of the customer class 300 may create a customer object 300a. Specific properties 330a associated with the instantiated object 300a, such as object ID=John_Doe 321a, name=John Doe 331a, sex=M 333a, etc. may be configured. Additional examples of object classes may include a business class, a reinsurance contract class, a reinsurance policy class, a reinsurance claim class, etc. As another example, a business rule may be defined as a class.

In most object-oriented languages, classes may be hierarchical. That is, some classes may be subclasses of a higher class, also known as a superclass. In the Java™ language, the subclass is said to extend the superclass. Alternatively, the superclass is said to be extended by the subclass. For the purposes of this disclosure, a subclass is considered to extend all or any of the classes that are above it in the hierarchy. It may also be said that the subclass directly extends the class immediately above it in the hierarchy, and indirectly extends higher classes in the hierarchy. For example, if a parent class is extended by a first subclass and that subclass is in turn extended by a second subclass, the second subclass can be said to extend the parent class as well as the first subclass.

Problem solving may be accomplished by sending message(s) to objects. A message may name a method and may optionally include other arguments associated with the method. When a message is sent to an object, the method is looked up in the object's class to find out how to perform that operation on the given object. If the method is not defined for the object's class, it may be looked for in its superclass and so on up the class hierarchy until it is found or there is no higher superclass. Message sends may return a result object, which may be an error, as in the case where no superclass defines the requested method.

The hierarchical definition of classes and subclasses based on shared properties and methods is very useful. A subclass includes all the properties and methods in the class of which it is a member (its parent class). The subclass is said to inherit the properties and methods of its parent class. This property is useful in defining subclasses because only those properties and methods that do not appear in the parent class need to be defined in the subclass (although properties or methods which appear in the parent class may be redefined in the subclass.) This allows the code written in the parent classes to be re-used so that the programmer does not have to rewrite or cut and paste code into each new subclass. Methods that are defined in the parent class may, however, be redefined in subclasses. This is referred to as overriding or hiding the previously defined method(s). In Smalltalk, for example, when a class A has a subclass B which overrides a method x defined in A, then, when the message x is sent to an instance of class B, class B's implementation of method x will be used. In some object-oriented languages, by redefining a variable that has already been defined in a superclass, the programmer may hide the previously defined variable (which is distinct from the object-oriented data hiding concept inherent in encapsulation.) In some object-oriented languages, subclasses may inherit properties and methods from several classes. This is called multiple inheritance. If a subclass can only inherit from one parent class, this is called single inheritance. Inheritance may also be dynamic and/or shared. Specifically, dynamic inheritance refers to the ability to add, delete, or change parents from objects (or classes) at run-time. Multiple inheritance brings up the possibility for a class to appear as a parent more than once in a class graph (shared or repeated inheritance), and there is then a potential to share that class. The Java™ and Smalltalk languages are characterized by single inheritance, not multiple.

Hierarchical class structure also allows the programmer to take advantage of a property referred to as polymorphism. Polymorphism is a mechanism by which various objects may be handled in the same way externally, even though there are differences in the way they are handled internally. In other words, the interface that the different objects present to an external entity is the same for each object, but the details of each object's implementation may vary. This allows objects instantiated from different subclasses to be handled identically even though the subclasses are not identical. For example, assume that a drawing program implements a class for shapes, a subclass for circles, and a subclass for squares, each of which has a method called draw( ). While draw( ) will be implemented differently for the circle subclass and the square subclass, the drawing program does not have to know the details of how a shape will be drawn, or even which of the shapes is to be drawn. The drawing program simply calls the draw( ) method for the object to be drawn and the implementation defined in the object's class will be used.

Figure 3B:
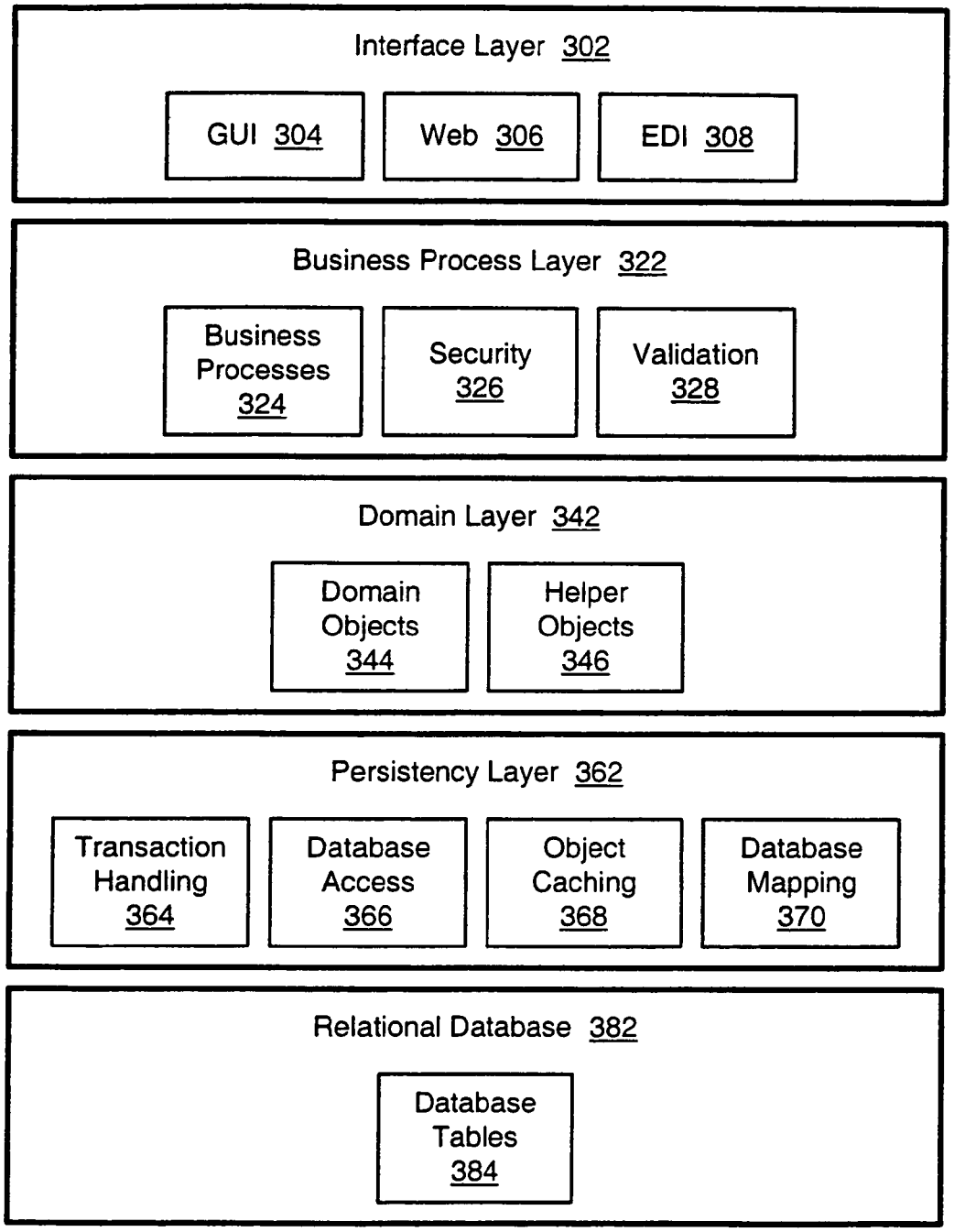
FIG. 3b is an illustration of a layered architecture of a reinsurance administration system according to one embodiment.

FIG. 3b: Layered Architecture of the Reinsurance Administration System

FIG. 3b illustrates a layered architecture of a reinsurance administration system according to one embodiment. The reinsurance administration system may include multiple layers or levels. As shown in FIG. 3b, the reinsurance administration system may include five layers: an interface layer 302, a business process layer 322, a domain layer 342, a persistency layer 362, and a relational database 382. Each layer may include objects that collaborate in solving the specific responsibilities of the layer. As used herein, an "object" is a unit of functionality that may include both data and methods for operating on the data.

In one embodiment, the interface layer 302 may include objects, which are responsible for presenting data to the user or to another system. The objects of the interface layer 302 may be responsible for providing input to the business process layer 322. For example, the interface layer 302 may include objects such as one or more graphical user interface (GUI) objects 304, one or more world wide web (WWW) objects 306, and one or more electronic data interchange (EDI) objects 308.

In one embodiment, the business process layer 322 may include objects, which are responsible for executing the steps of a logical unit of work. For example, a logical unit of work may include executing validation, committing a transaction, and rolling back a transaction. The business process layer 322 may include objects such as one or more business process objects 324, one or more security objects 326, and one or more validation objects 328. A business process object may be responsible for user access privileges or other security issues, obtaining or generating domain data, validation of domain data, and adding, modifying, and deleting data held by a database. In one embodiment, business processes are coordinators and do not generally implement the actual code, which performs basic tasks. The actual code may be implemented in domain objects 344 or in support processes, which are created and used by a business process.

In one embodiment, the domain layer 342 may include objects, which are responsible for holding application data and implementing basic business functionality. For example, the domain layer 342 may include objects such as domain objects 344 and helper objects 346. The domain objects 344 and helper objects 346 may collaborate to provide a concrete representation or definition of the business objects 324. The objects in the domain layer may implement reinsurance functionality without reference to implementation details such as persistency and user interfaces.

In one embodiment, the persistency layer 362 may include objects, which are responsible for enabling communication between the domain layer 342 and the relational database 382. For example, the persistency layer 362 may convert domain objects to rows in the relational tables, may provide an object caching mechanism, and may manage memory transactions. The persistency layer 362 may include objects such as one or more objects for transaction handling 364, one or more objects for database access 366, one or more objects for object caching 368, and one or more objects for database mapping 370.

In one embodiment, the relational database 382 may include one or more database tables 384. The relational database may communicate with the persistency layer 362 through the Open Database Connectivity (ODBC) standard for database access. In one embodiment, the database 382 may be any database which is ODBC-compliant. The database tables 384 may store objects from the other layers in a persistent form.

Figure 4:
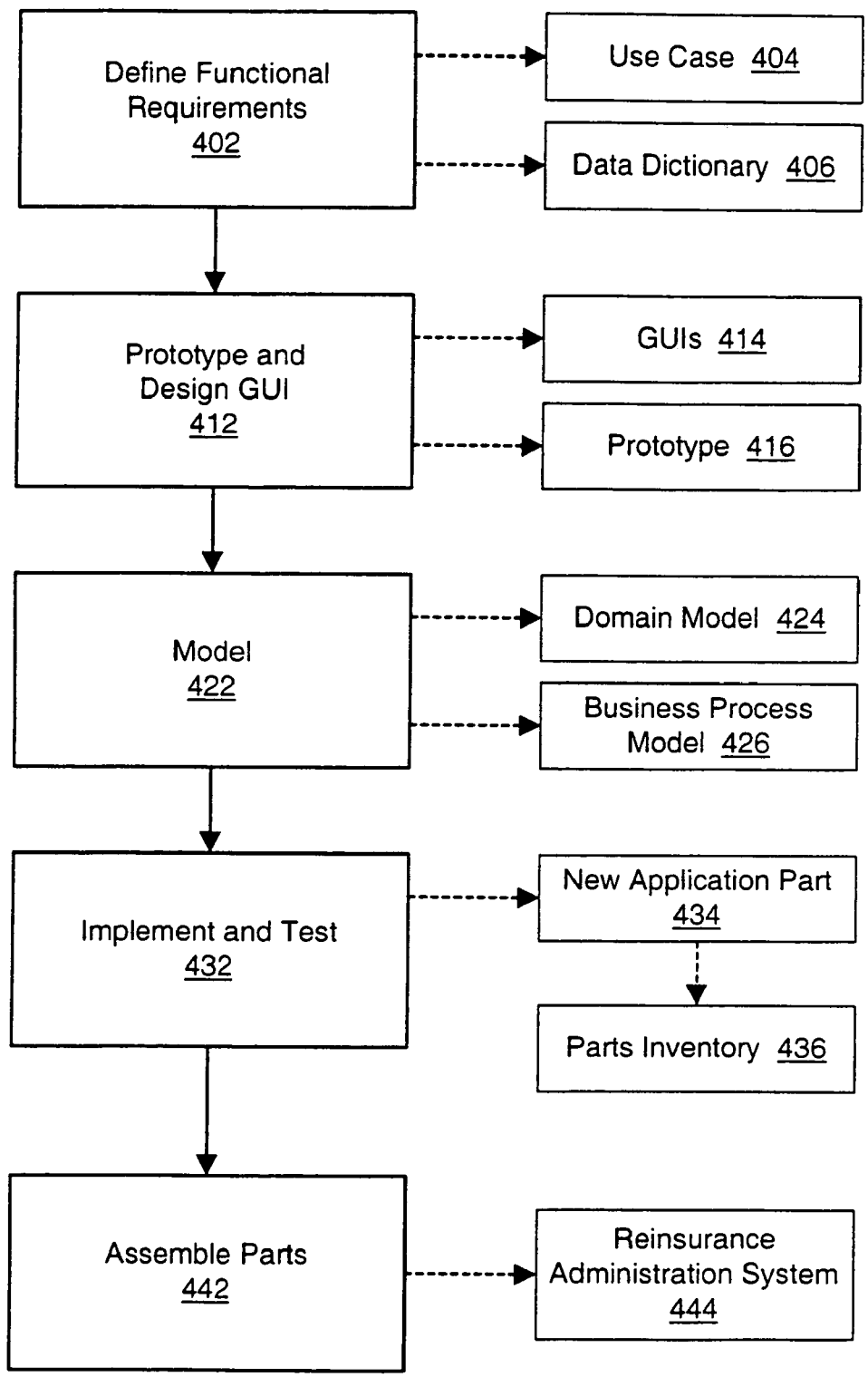
FIG. 4 is an illustration of a development process for developing a reinsurance administration system according to one embodiment.

FIG. 4: Development of a Reinsurance Administration System

FIG. 4 is an illustration of a development process for developing a reinsurance administration system according to one embodiment. The reinsurance administration system may be developed with software tools such as compilers, object-oriented development environments, and other suitable tools. In one embodiment, a Smalltalk development environment may be used. The development process may re-use program code for increased efficiency, reduced development time, and reduced cost.

In step 402, functional requirements may be defined. The results of step 402 may include at least one use case 404 and a data dictionary 406. As used herein, a "use case" may define a particular business function or grouping of business functions. In other words, use cases may correspond to business requirements for the reinsurance administration system. In one embodiment, the reinsurance administration system may include use cases for "basic" or "support" data such as a reference data administration use case, a system parameter administration use case, a security administration use case, a currency administration use case, a reporting unit administration use case, a risk zone administration use case, and a location administration use case. Use cases may also assist a user of the reinsurance administration system in carrying out his or her daily work. For example, these use cases may include a use case for creating or setting up a new business (e.g., a reinsurance policy), a use case for renewing a business (e.g., a new insurance period), a use case for registering a new claim against a business, a use case for entering technical booking items (e.g., premium, claim, commission) against one or more business(es), and a use case for registering a remittance (i.e., payment) against a business partner.

In step 412, prototyping and GUI design may be performed. The results of step 412 may include graphical user interfaces (GUIs) 414 and at least one prototype 416. A prototype may be a demonstration program that may not include the complete functionality of the final version of the program, but rather may demonstrate the capabilities planned for the final version.

In step 422, modeling may take place. Step 422 may produce a domain model 424 and a business process model 426. The domain model 424 and/or business process model 426 may embody one or more use cases as developed in step 402.

In step 432, application parts may be implemented and tested. The results of step 432 may include at least one new application part 434. An application part may be one or more new parts 434 or a combination of such parts. The application part 434 may be placed in a parts inventory 436 with other application parts. The application parts in the parts inventory may be used and re-used to build one or more application programs. In one embodiment, the system for developing a reinsurance administration system may include a variety of design patterns and reusable parts in the parts inventory 436. For example, the system for developing a reinsurance administration system may include a general pattern for building "Find . . . " components (e.g., Find Business, Find Business Partner, Find Claims, etc.), domain class mediators (for retrieving items such as currencies, countries, states, country groups, etc.), and/or a general pattern for integrating new business condition components within the business structure. The system for developing a reinsurance administration system may also include reusable GUI parts such as a calendar widget for entering dates, a select/available widget, domain object drop-down lists, and many larger-grain GUI parts that may include multiple basic widgets.

In step 442, the parts may be assembled to build a computer-executable reinsurance administration system 444. Steps 402, 412, 422, 432, and 442 may be repeated a plurality of times to produce a plurality of reinsurance administration systems 444. The plurality of reinsurance administration systems may include multiple versions of one reinsurance administration system 444. The design process illustrated in FIG. 4 may therefore include the ability to extend and customize the reinsurance administration system to accommodate new and specialized requirements.

Using Frameworks to Develop a Reinsurance Administration System

One or more frameworks may be utilized by a developer to build one or more reinsurance management systems. The frameworks may include functionality for solving general and recurring problems. Use of the frameworks during development may therefore decrease the time and expense associated with product development.

A framework may include a collection of classes, which contain logic for solving problems that are common to a range of functional requirements. To solve a specific requirement which falls within the range of requirements for which a framework was designed, a developer may create subclasses of the classes contained within a framework. While the inherited properties of the classes will provide the solutions to the general aspects of the problems to be solved, the developer may implement solutions to special requirements by providing specialized code and data. The developer may add additional behavior by adding methods to the subclasses, and/or by making the classes collaborate with other, specialized classes. A framework may provide general methods, called "hook" methods, that may be overridden by the developer to identify what action the system should take at a certain point. Thus, a framework may provide patterns and templates for how to solve common requirements. By doing so, a framework may permit a group of developers to avoid solving the same class of problem in different ways.

For example, for most windows in a graphical user interface, a common requirement is that it must be possible to close the windows. Therefore, a common feature of most windows is a "close" button or another means for the user to close the windows. An additional requirement may be that the system should ask the user whether data changes should be saved when the user chooses to close a window. These requirements may be solved by reusable portions of a framework to avoid re-implementing the requirement for each new window. The framework may also provide a hook method that may be overridden by a developer to implement saving data changes upon the closing of a window.

The frameworks in the system for developing reinsurance administration systems may include technical frameworks and industry frameworks. Generally speaking, technical frameworks may implement common, general business behavior. Technical frameworks may be reusable in a variety of types of software program applications such as reinsurance administration programs. Technical frameworks may enable developers to focus on implementing business rules. Technical frameworks may enable inexperienced developers to become productive in record time.

Industry frameworks may implement common behavior and object models for a particular business area. An object model framework may abstract and encapsulate complex business structures. In one embodiment, the object model framework may capture the multiple dimensions of a contract and hide the multi-dimensional aspect of a contract from subsequent domain modeling. The multiple dimensions of a contract may include multiple reinsurance periods, multiple life cycle phases per insured period, multiple sections per life cycle phase, multiple amendments per life cycle phase, and contract conditions per section and per amendment, wherein the sections may be organized in a hierarchy. In one embodiment, a behavior framework may abstract and encapsulate business rules for managing the multiple contract dimensions into an abstract framework. A behavior framework may provide inherited functional support to core business components. A behavior framework may include support for component-based development.

The frameworks may include a business process framework. As used herein, a "business process framework" may include a framework for developing business processes. As used herein, a "business process" may include a computer-based representation of a use case or business function to be performed in a line of business. The business process framework may allow developers to focus their attention on business-specific requirements, while the framework handles common, "technical" requirements. In short, the business process framework may allow a developer to quickly assemble a business process component. The business process framework may include a plurality of high-level business process classes. The high-level business process classes included in the business process framework may include default implementations for hook methods which subclasses may override. In one embodiment, a developer may create a new business process component by subclassing another business process class from an existing business process class. The many classes that together make up a reinsurance software system may be arranged in a hierarchy. At the top of the hierarchy may sits the most general, abstract business process class. This class may be subclassed by one or more other classes, some of which may be abstract. Classes which are not abstract are considered to be concrete. This process of subclassing may go on virtually indefinitely. The hierarchy of (sub)classes need not be balanced; that is, concrete classes may appear at various levels. A class which has multiple subclasses may serve to capture behavior (i.e., logic) that is common to its subclasses. Unlike the concrete classes, the abstract classes are not intended to be instantiated as objects at runtime.

A business process class may implement its required behavior by identifying appropriate support processes for its configuration and by overriding selected hook instance methods provided by the framework (i.e., in one embodiment, the topmost business process classes in the hierarchy). As used herein, "support processes" may include computer-based processes for performing tasks associated with a business process. As used herein, "hook methods" may include methods in a parent class which provide default methods to be inherited by a child class and which may be overridden by the child class. The business process framework may provide many support process methods, classes, and subclasses which may implement behavior for: precondition checks (for data requirements to start a business process), security checks (for user access to functions and data), data entry, graphical user interfaces (GUIs), data and syntax validation, persistent data storage, committing changes to a database, rolling back changes to a database, and other suitable functions.

As used herein, "support processes for data validation" may include support processes for validating data prior to committing the data to a database. As used herein, "support processes for security" may include support processes for controlling the access of a user to particular business functions. As used herein, "support processes for persistent data storage" may include support processes for storing data in a database or other data storage system. As used herein, "support processes for precondition checks" may include support processes for determining whether a business process has the necessary initial data to begin its execution. As used herein, "support processes for data entry" may include support processes for obtaining data from a user through a user interface, from another computer-based process on the same computer system, and/or from another computer system over a network.

In one embodiment, the business process framework may automatically handle requirements such as, for example: opening a specified window, adding Cancel/OK/Save/Help buttons to an open window, providing the behavior for buttons added to a window, stepping through the different steps or stages of the business process template (e.g., pre-execution, data entry, validation, pre-commit, commit, post-commit) and executing the specific logic that may be specified by a developer for each phase, performing a rollback of objects in memory upon error or cancellation by a user, performing validation, committing changes to the database, performing write-lock checking, and/or logging and displaying error messages.

Figure 5:
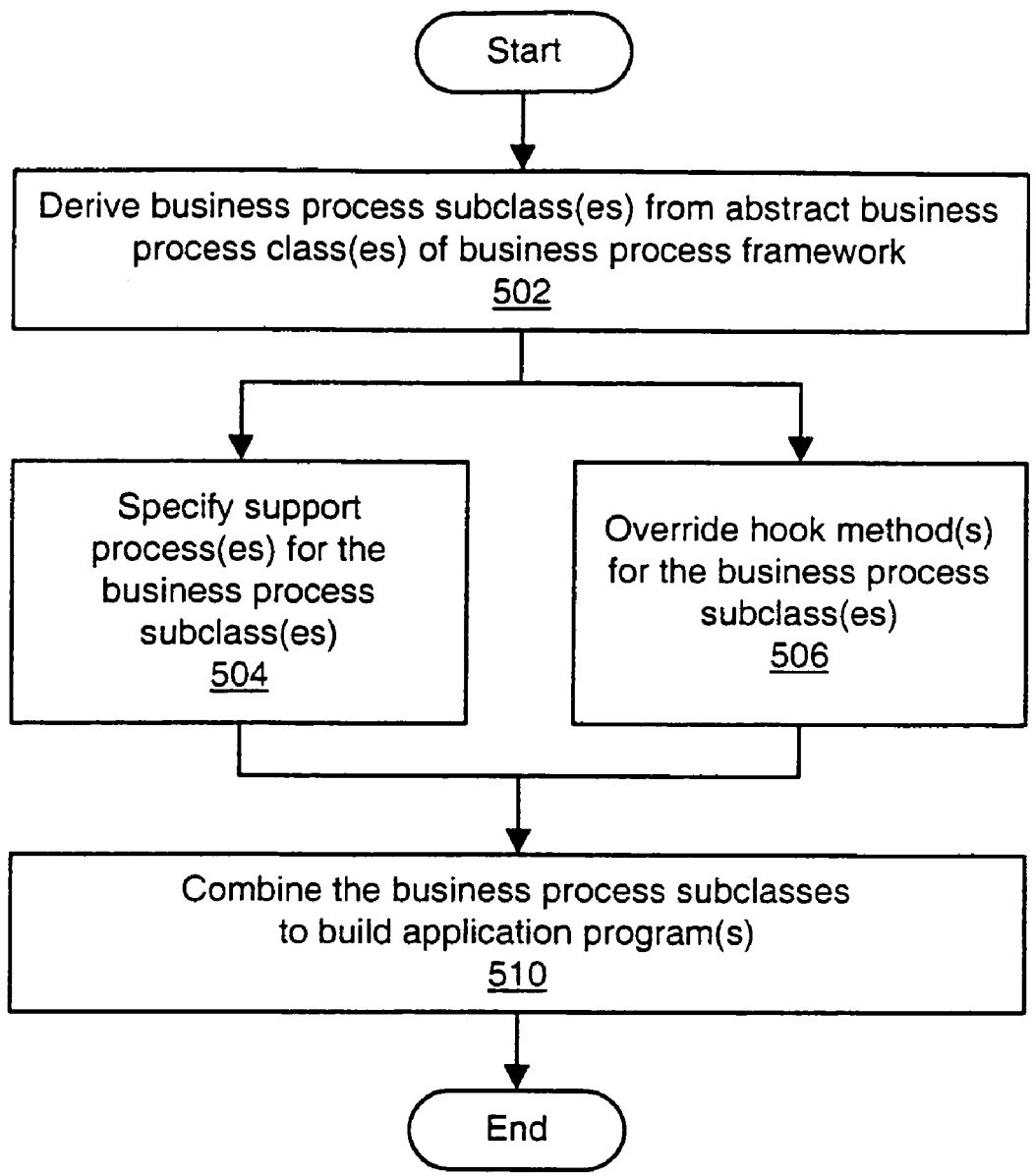
FIG. 5 is a flowchart illustrating the development of a reinsurance administration system through a business process framework according to one embodiment.

FIG. 5: Using a Business Process Framework

FIG. 5 is a flowchart illustrating the use of a business process framework by developers to build application programs for reinsurance administration with increased re-use of existing functionality and decreased development time. In various embodiments, the steps shown in FIG. 5 may be performed in a different order. In one embodiment, the method may include deriving or subclassing the plurality of business process classes from the business process framework in step 502. One or more business process subclasses may be derived from one or more abstract business process classes, wherein the business process framework may include the one or more abstract business process classes. In one embodiment, business process subclasses may be derived from concrete business process classes as well as abstract business process classes.

The business process framework may include a plurality of support processes. In step 504, one or more of the support processes may be specified for each of the business process subclasses. The support processes may include support processes for data validation, support processes for performing syntax validation, support processes for graphical user interface elements, support processes for persistent data storage, support processes for performing precondition checks, and/or support processes for other suitable functions. In one embodiment, identifying one or more of the support processes for each of the business process subclasses may include overriding one or more of the hook methods for each of the business process subclasses.

The business process framework may include a plurality of hook methods. The hook methods may permit the developer to access various points during the execution of the business process. In step 506, the developer may override one or more hook methods for a business process subclass. By overriding the hook methods, the developer may identify methods to be performed at various points during execution of the business process. Overriding one or more of the hook methods for each of the business process subclasses may include replacing one or more of the hook methods derived from the abstract business process classes with one or more new methods for each of the business process subclasses. The hook methods may include, for example, methods to be executed during initialization of the business process, methods to be executed prior to execution of a data entry support process, methods to be executed during execution of data entry without a user interface, methods to be executed prior to execution of a database commit support process, and/or methods to be executed prior to execution of a database rollback support process. As will be apparent to one skilled in the art, many more hook methods may be available to be overridden by a business process subclass.

The common functionality of the business process framework may include an order for executing steps in a business process. The steps in the business process may include pre-execution, data entry, data validation, pre-commit to a database, commit to the database, and post-commit to the database. These steps are further discussed with reference to FIGS. 6a and 6b. The common functionality of the business process framework may include behavior for buttons in a graphical user interface, formatting and displaying windows in a graphical user interface, methods or variables of the abstract business process classes which are inherited by the business process subclasses, logging and displaying error messages, committing changes to a database, and/or rolling back changes to a database. In one embodiment, a first business process subclass may be configured to invoke a second business process subclass.

In step 510, the business process subclasses may be combined to build one or more application programs, such as application programs for reinsurance administration. The resulting application program(s) may be stored on a storage device. When the resulting application program(s) are executed, business process objects will be instantiated from the business process subclasses created by the developer.

Figure 6A:
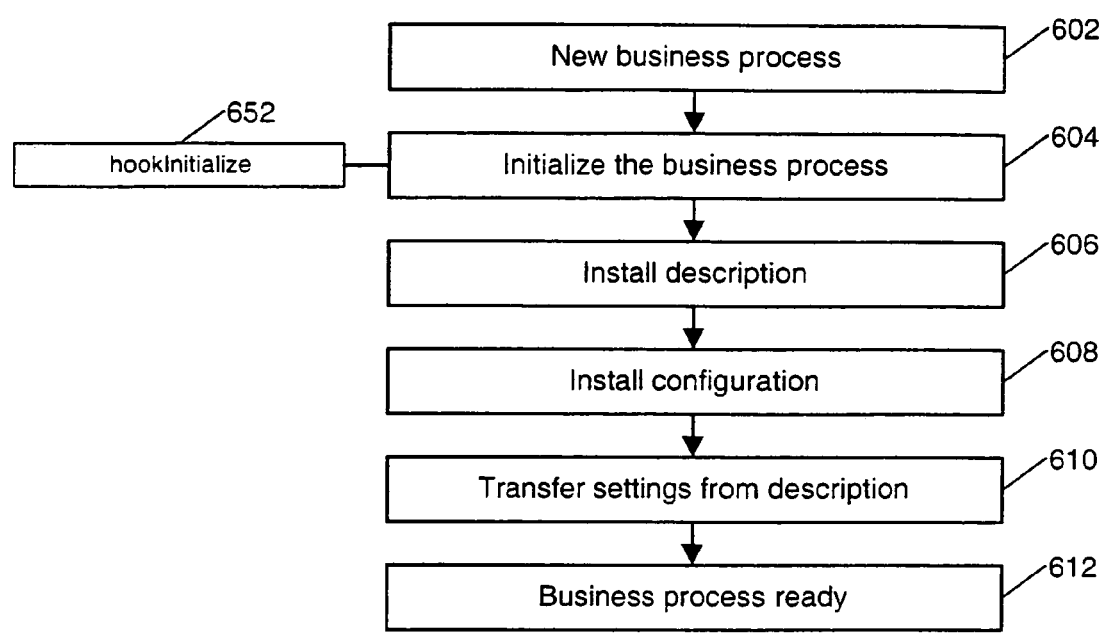
FIGS. 6a and 6b are state diagrams illustrating the life of a business process according to one embodiment.
Figure 6B:
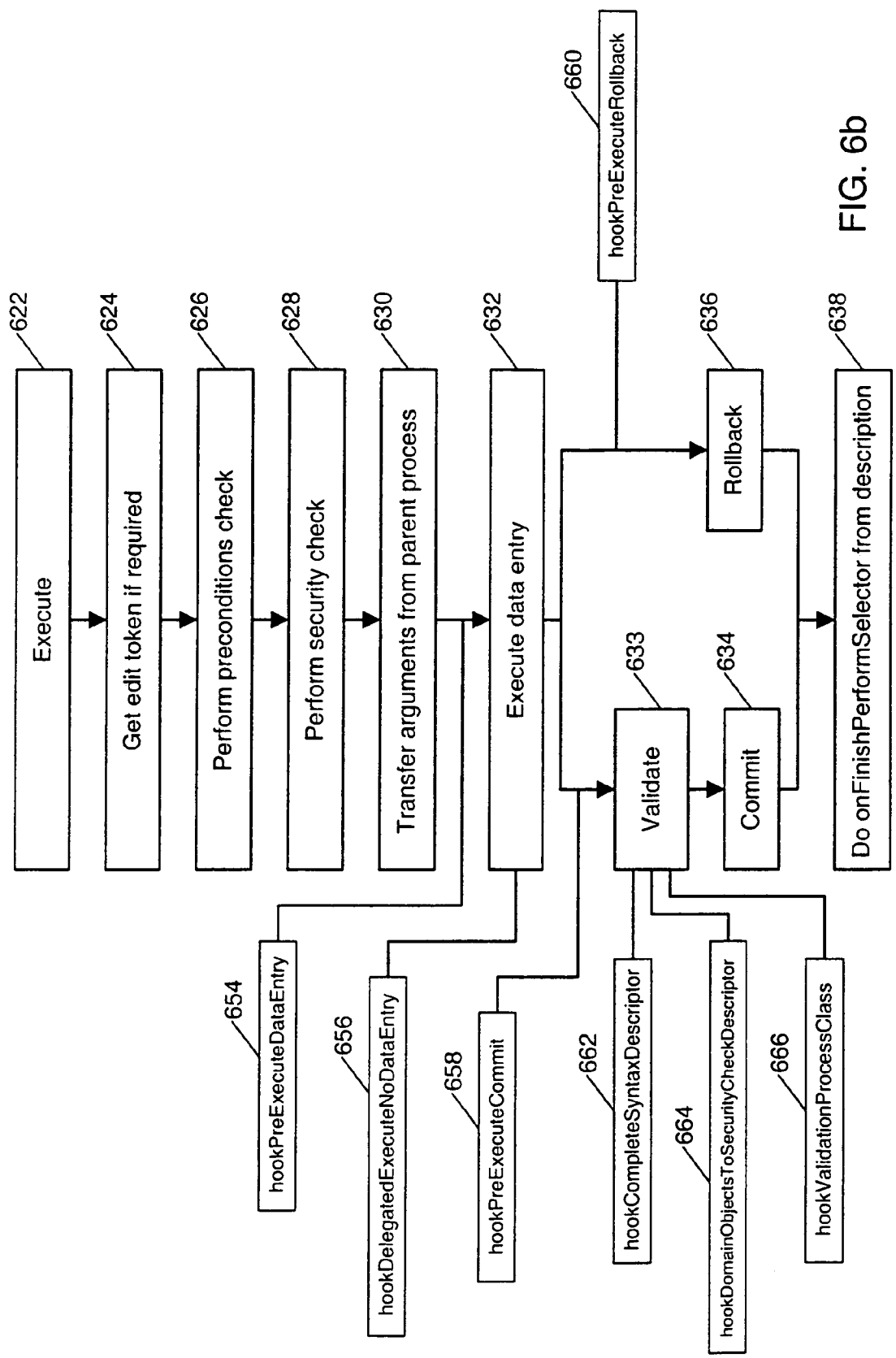

FIGS. 6a and 6b: The Life of a Typical Business Process

FIGS. 6a and 6b are state diagrams illustrating the life of a typical business process according to one embodiment. In one embodiment, the business process framework may implement a business process state transition machine and control the sequencing of steps in a business process. A developer may override hook methods to identify methods to be performed at various stages in the sequence of steps in life of the business process.

In one embodiment, when a new business process is created in step 602 by instantiating a business process object from the corresponding class, it will execute the states shown in FIG. 6a and stop in the ready state 612. These states or steps may include initialization 604, installation of a description 606, installation of a configuration 608, and transferal of settings from the description 610. The business process may remain indefinitely in this state until it receives an execute command. Once execution starts, there are many paths, which the process can follow, and a common path is illustrated in FIG. 6b. If the business process uses an interactive GUI interface for the data entry, then the business process may proceed from the ready state 612 through to the execute data entry state 632 and remain there indefinitely until the user chooses to save, cancel, or close. The other steps or states may include initial execution 622, getting an edit token if required 624, performing a preconditions check 626, performing a security check 628, and transferring arguments from a parent process 632. Once the user chooses to exit the data entry state 632, the business process may execute either a validate 633 and commit 634 or a rollback 636 and then do the finishing actions 638.

In one embodiment, performing the security check 628 may include determining whether a user has the proper access rights to access a particular use case. Support processes for access security may guarantee no access security, access security on a business process level, or access security with domain restriction. A support process for access security on a business process level may determine whether the user has the access right to execute a business process, wherein the business processes in the reinsurance administration system are each linked to a particular access right. A support process for access security with domain restriction may be similar to a support process for access security on a business process level but may also test domain restrictions for the user.

As discussed with reference to FIG. 5, one or more hook methods may be provided to allow the developer to access clean points in the execution of the business process. A hookInitialize method 652 may be executed during initialization of the new business process. This method may be sent before the description is available and before any support processes are created. A hookPreExecuteDataEntry method 654 may be executed just prior to the execution of the data entry support process. In one embodiment, if the business process has an associated window, the window will not be opened until the data entry support process is executed. In one embodiment, invocation of a child business process from this hook method 654 is not allowed.

In one embodiment, a hookDelegatedExecuteNoDataEntry method 656 may only be used if the business process is configured with a CnuNoDataEntry support process and will occur during the execute data entry phase 632. This hook 656 is provided to allow a business process which operates without a user interface to perform some required processing before the business process commits. In one embodiment, invocation of a child business process from this hook method 656 is allowed.

In one embodiment, a hookPreExecuteCommit method 658 may be executed prior to the execution of the commit support process 634. In one embodiment, invocation of a child business process from this hook method 658 is allowed. A hookPreExecuteRollback method 660 may be executed just prior to the execution of the rollback support process 636. In one embodiment, invocation of a child business process from this hook method 660 is allowed.

In one embodiment, a plurality of hooks may be used by the developer to modify the complex process of validation 633. Validation may include syntax validation of the business process, a domain restriction security test, and any additional, business-process-specific validation that the developer may have specified for the business process. Syntax validation of the business process may itself include syntax validation of those domain objects the business process has specified in one of its hooks, such as hookCompleteSyntaxDescriptor 662. The domain restriction security test may use hooks such as hookDomainObjectsToSecurityCheckDescriptor 664 to check that the data values entered into the domain object(s) by the user are in accordance with the privileges stored in the user's logon profile for the reinsurance administration system. The additional, business-process-specific validation may use hooks such as hookValidationProcessClass 666.

Standard Methods to Override and Standard Classes to Subclass

The business process framework may include a plurality of standard methods that may be overridden and a plurality of standard classes that may be subclassed by developers. Several examples are discussed as follows; as will be apparent to one skilled in the art, many more hook methods and classes may be used. A hookCommitProcessClass may provide the functionality to handle the commit and transaction allocation for a business process. A hookPreExecuteDataEntry method may be used to set up anything that is needed before the data processing process is executed. A business process that is responsible for the creation of a new object would normally override the hookPreExecuteDataEntry method in order to implement the instantiation of the new object. As discussed with reference to FIG. 6*b*, a hookValidationProcessClass, hookDomainObjectsToSecurityCheckDescriptor, and hookCompleteSyntaxDescriptor may provide the functionality for doing any necessary validation before any data is to be committed. In one embodiment, data will be committed only once all validation executes successfully.

A hookGuiInterfaceSpecificationInSession may provide the specification of what the GUI interface is to look like. From this specification, a window may be built depending on how the business process is used. A guiInterfaceWindowLabel may return a string label to use to place on the window that may be scheduled for the business process. A hookGuiInterfaceClass may hold all of the functionality that is GUI-specific to how a business process is handled. Functions such as sorting lists and converting a radio button into a domain value may be handled by an instance of this class. In one embodiment, for example, any dynamic label of a window label would be handled here.

Figure 7A:
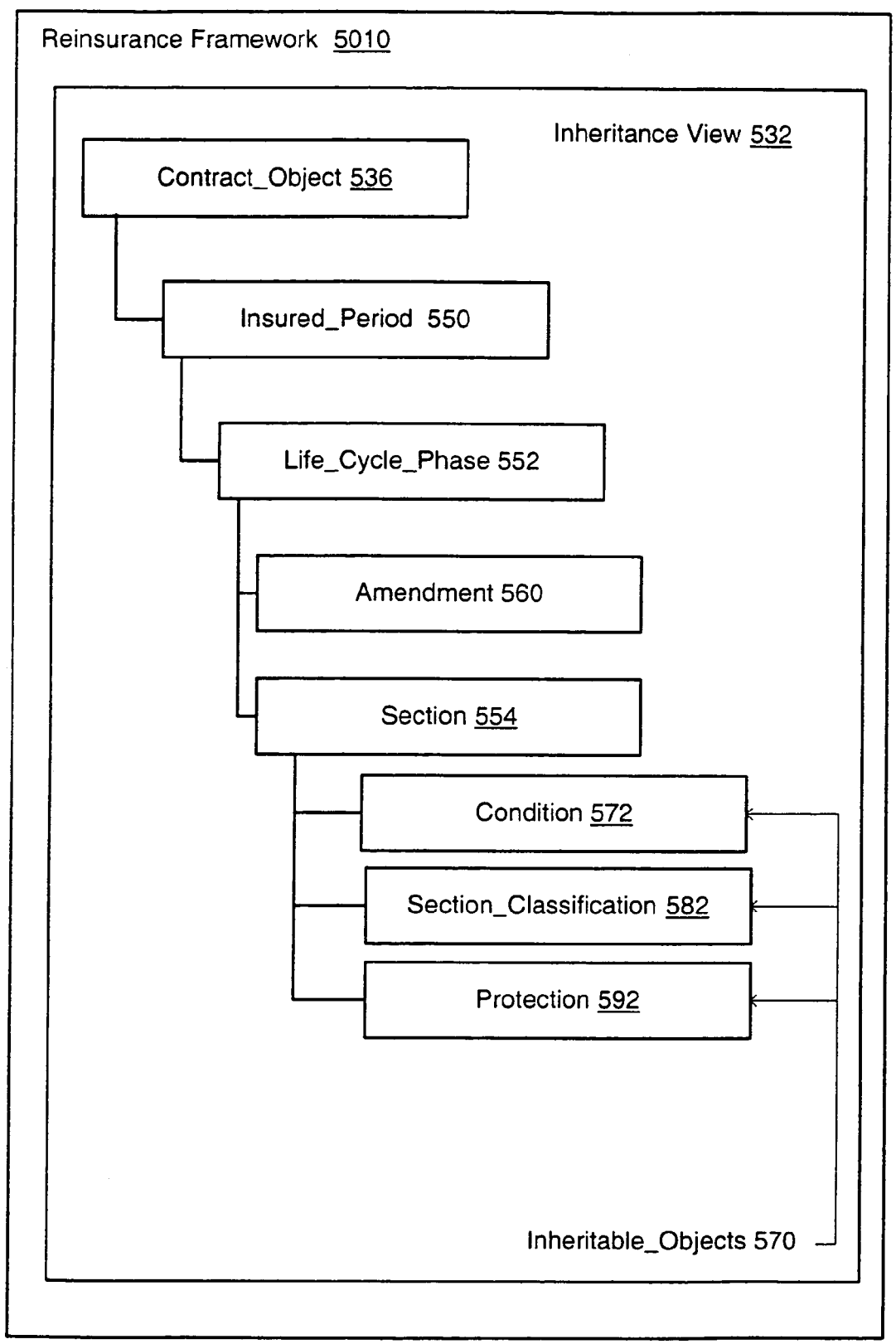
FIG. 7a illustrates one embodiment of an inheritance view of a hierarchy of business objects.

FIG. 7*a*: Illustrates One Embodiment of an Inheritance View of a Hierarchy of Business Objects and FIG. 7*b*: Illustrates One Embodiment of an Inheritance View of a Section Object A typical reinsurance contract may include, but not be limited to, several attributes such as an insured period, i.e., a period representing the term of the reinsurance contract, contract conditions, insurance coverage, partners, amendments, premiums, etc. Each attribute may vary independently of the other attributes. Thus a reinsurance contract may be viewed to have multiple dimensions depending on the number of independent variable attributes included in the reinsurance contract. For example, the multiple dimensions of a contract may include multiple reinsurance periods, multiple life cycle phases per insured period, multiple amendments per life cycle phase, etc.

In one embodiment, the reinsurance transaction processing software may include an object-oriented framework, the multi-dimensional reinsurance contract framework. In one embodiment, the multi-dimensional reinsurance contract framework may permit the handling of the four dimensions of a reinsurance contract. For example, the first dimension may handle different versions of the reinsurance contract (e.g., yearly periods). The second dimension may handle multi-level specialization hierarchy (e.g., different conditions for different sections of the reinsurance contract). The third dimension may handle the change of conditions within a period, potentially only for one section and the fourth dimension may process inheritance of contract structure and conditions vertically from a parent section to a child section and/or horizontally from a section of one reinsurance contract to the same section in another, linked reinsurance contract. This framework may use an object model to capture the four dimensions and hide the multi-dimensionality from subsequent domain modeling and the design of additional reinsurance contract components. This framework may also encapsulate business rules for managing the four reinsurance contract dimensions into an abstract framework.

In one embodiment, the reinsurance transaction processing software may include an object-oriented framework to process one or more reinsurance business transactions. The object-oriented framework 5010 may include a collection of classes of objects. In one embodiment, an entire reinsurance business transaction or a part thereof may be represented as a contract class. A contract object 536 may be created by instantiating a contract class. In one embodiment, a contract class may be a concrete subclass of a hierarchy of contract classes. The concrete subclass may capture special properties and methods for a specific level of business. In one embodiment, a user may configure customized methods and properties associated with the specific level of business. Examples of the level of business may include assumed business, outward cedent's contract, own retention, etc. The reinsurance contract object 536 may represent one reinsurance contract, including all terms and conditions, all history and all attributes associated with the contract. The reinsurance contract object 536 may include properties and methods associated with the reinsurance contract. Examples of properties associated with the reinsurance contract object 536 may include, but not limited to, reinsurance period, life cycle phase per insured period, section(s) per life cycle phase, amendment(s) per life cycle phase, contract conditions per section and per amendment.

In one embodiment, an insured period object 550 may be created by instantiating an insured period class. In one embodiment, an insured period class may be a concrete subclass of a hierarchy of insured period classes. The concrete subclass may capture special properties and methods for a specific level of business. If the insured period is yearly then it may be also referred to as the underwriting year. In one embodiment, the insured period object 550 may own all terms and conditions, all history and all of its child objects for one calendar period of the reinsurance contract.

In one embodiment, a life cycle phase object 552 may be created by instantiating a life cycle phase class. In one embodiment, a life cycle phase class may be a concrete subclass of a hierarchy of life cycle phase classes. Typical life cycle phases included in a reinsurance contract may include new agreement offered, offer accepted, offer declined, new quote requested, renewal offered, etc. In one embodiment, the life cycle phase object 552 may own all terms and conditions, all history and all child objects for one phase of one calendar period of the reinsurance contract.

In one embodiment, a section object 554 may be created by instantiating a section class. In one embodiment, a section class may be a concrete subclass of a hierarchy of section classes. Sections may be organized in a hierarchy.

Figure 7B:
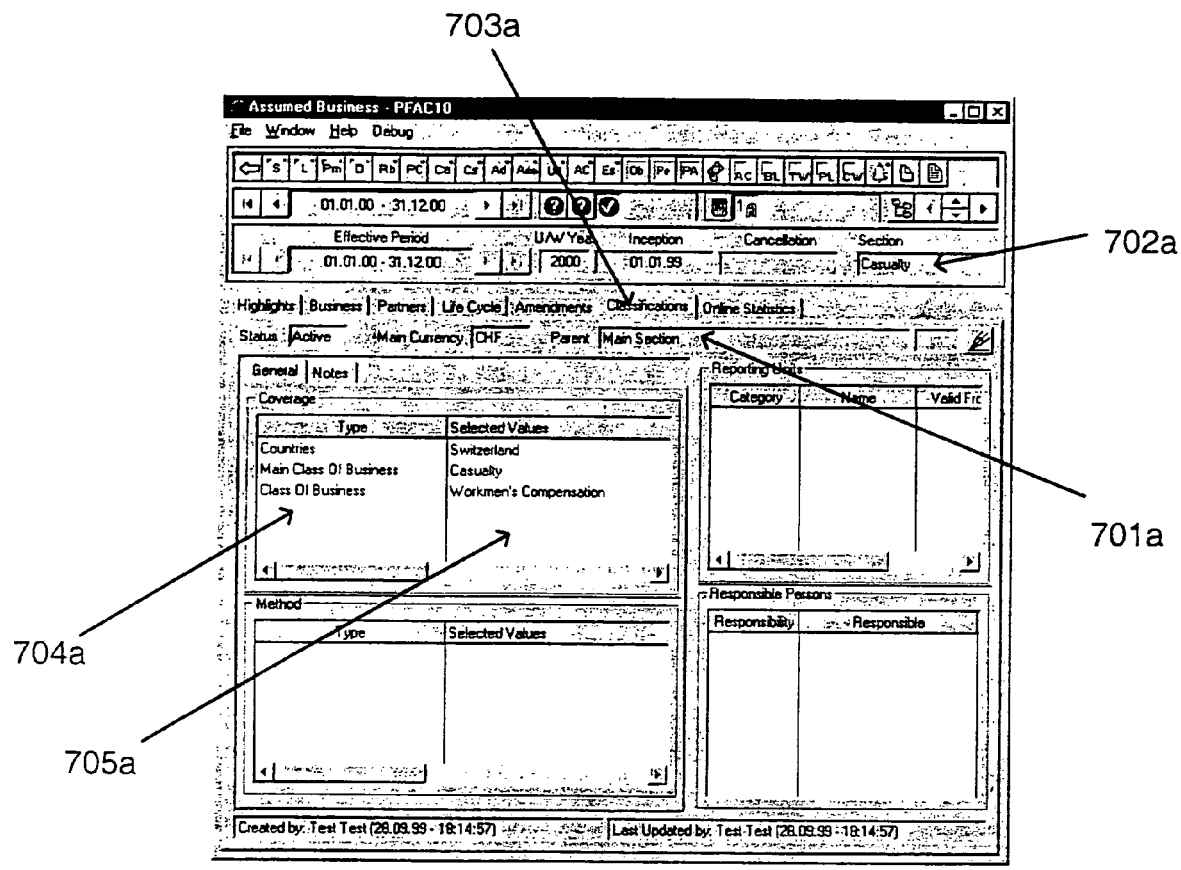
FIG. 7b illustrates one embodiment of an inheritance view of a section object.
Figure 8A:
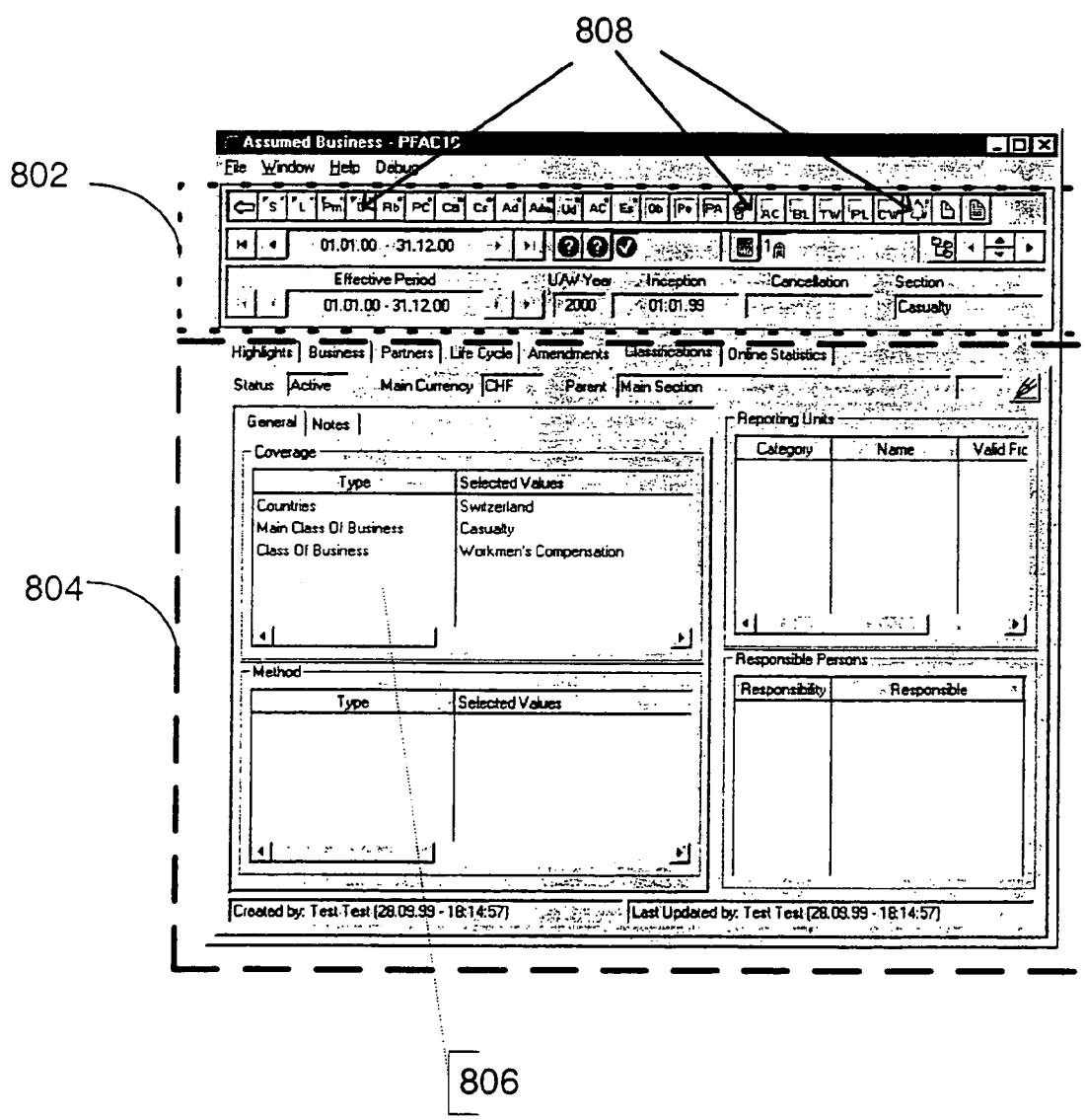
FIGS. 8a through 8d illustrate one embodiment of a graphical user interface for processing a reinsurance business transaction.
Figure 8B:
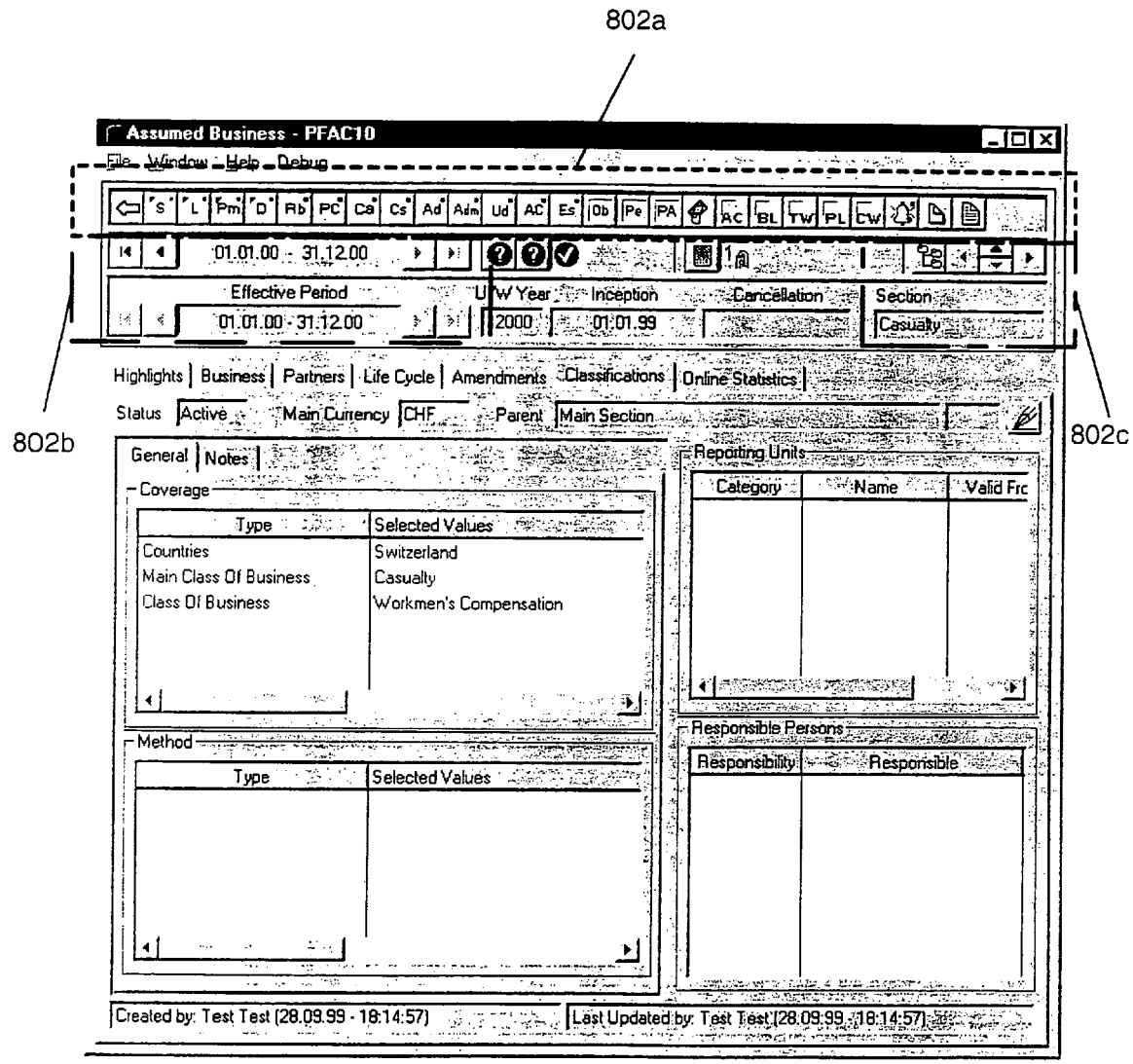
Figure 8C:
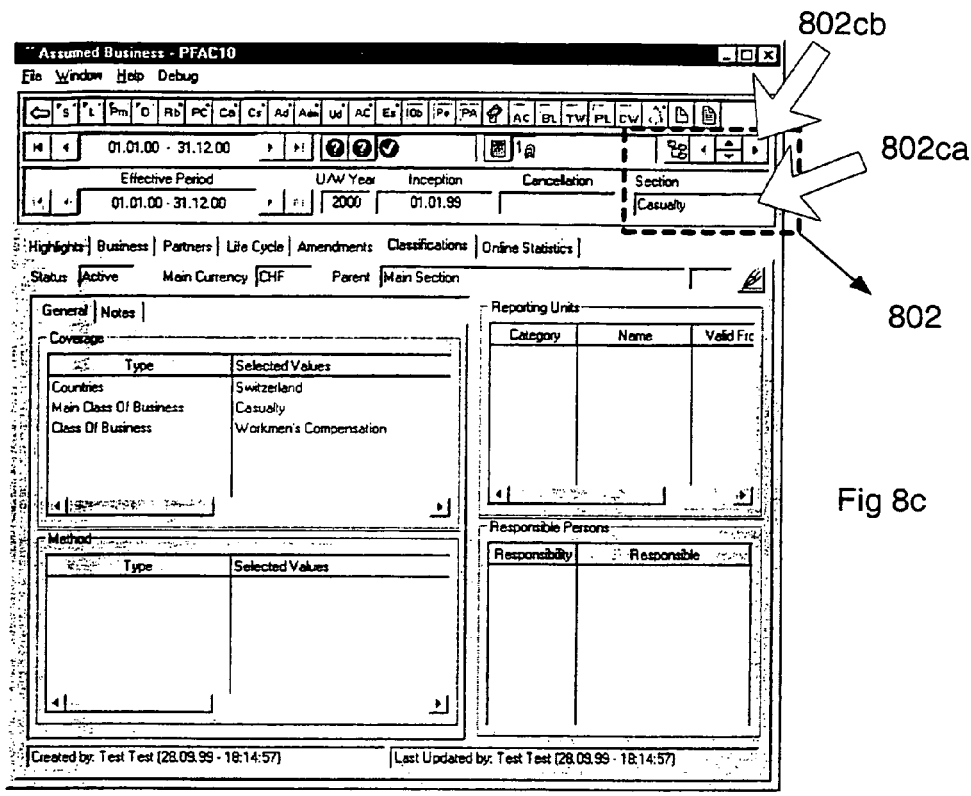
Figure 8D:
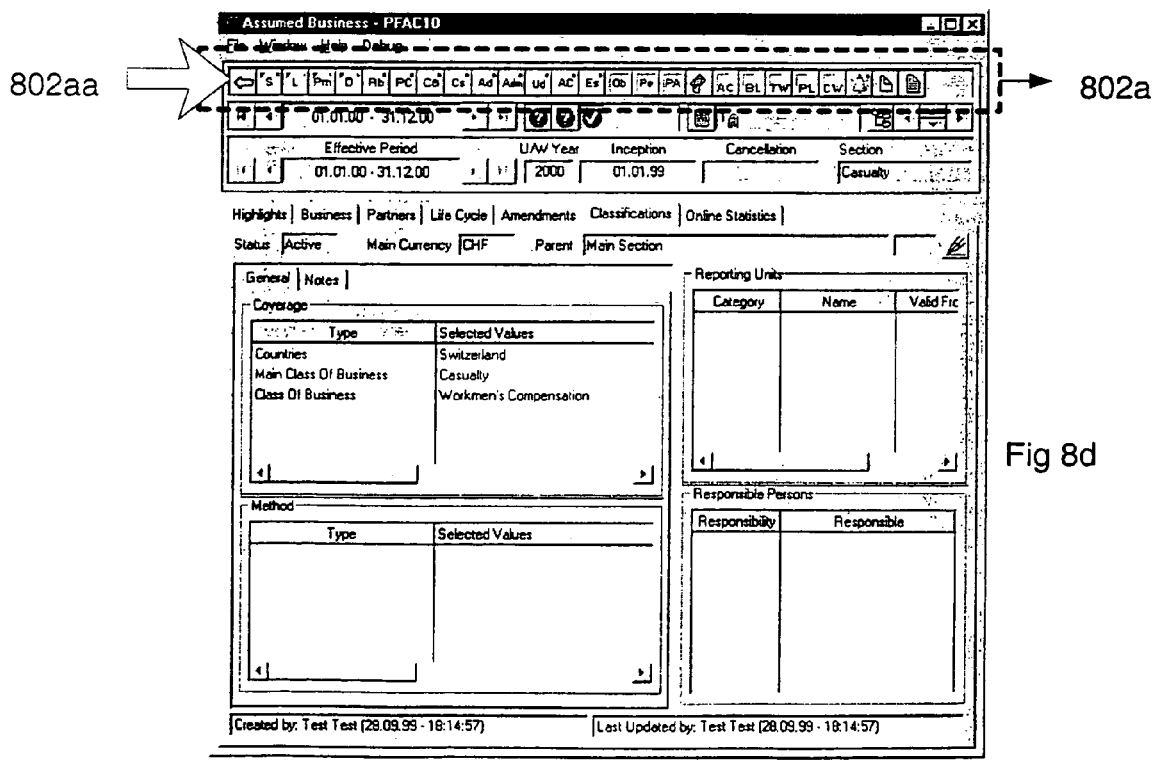

The highest-level section object 554 may also be referred to as the main or root section 701a in FIG. 7b. The root section object 554 may have zero or more child section 702a objects. Each child section object 702a may have zero or more sub-child section objects. Each section object 554 may have a classification 703a with one or more categorization values. Typical categories 704a are main class of business, class of business, risk area country, type of participation, etc. Typical categorization values 705a are casualty, workmen's compensation, aviation, marine, marine hull, marine machinery, etc. The classification of a child section 702a must be a subset of the classification of its parent section. In one embodiment, the section object 554 may own all terms and conditions, all history and all child objects for one section of one phase of one calendar period of the reinsurance contract.

In one embodiment, an amendment object 560 may be created by instantiating an amendment class. In one embodiment, an amendment class may be a concrete subclass of a hierarchy of amendment classes. In one embodiment, the amendment class may include an abstract class and two concrete subclasses of the abstract class. The first amendment concrete subclass may be used to define the initial terms and conditions. The second amendment concrete subclass may be used to amend one or more conditions within the insured period. Amendments may be shared amongst all life cycle phases within an insured period. In one embodiment, when a condition, e.g., a premium condition, is amended, the insured period gets divided into a set of non-overlapping effective periods that together make up the insured period. In one embodiment, conditions such as premium, limit, deduction, share, etc. may be amended. Section classification and protection may also be amended. Examples of protection, which may be amended, may include treaty, faculty, proportional/non-proportional protection assignments, retrocession contracts, own retention, etc.

In one embodiment, the reinsurance transaction processing software may include an object-oriented framework, the condition component framework. This framework, i.e., the condition component framework, may permit the addition and/or modification of condition components of the reinsurance contract. These components may comprise, for example, premium limits, consolidation conditions, and other conditions for reinsurance contracts. In one embodiment, the components may be implemented as reusable objects.

In one embodiment, the reinsurance framework 5010 may include one or more classes that represent contract properties that may be shared. An inheritable object 570 may be created by instantiating an inheritable class. Each inheritable object may have a parent or an owning section. In addition, each inheritable object may be connected to zero or more other sections in inherited or shared mode. Inheritance may be vertical or horizontal. Vertical inheritance means inheriting from a parent section. Horizontal inheritance means inheriting from the same section in another, linked reinsurance contract. An inheritable object may be read/viewed both from the context of its owning section and its inheritor sections. An inheritable object may only be edited in the context of its owning section. Examples of shared inheritable objects include a condition object 572, a protection object 592, and a section classification object 582.

FIGS. 8a through 8d—Illustrates One Embodiment of a Graphical User Interface for Processing a Reinsurance Business Transaction A typical reinsurance business transaction may include, but not be limited to, submitting a quotation for a reinsurance policy, calculating a premium associated with a reinsurance policy, issuing a contract for a reinsurance policy, processing a claim, etc. A reinsurance contract may be one embodiment of a reinsurance transaction. A typical reinsurance contract may include, but not be limited to, several attributes such as an insured period, i.e., a period representing the term of the reinsurance contract, contract conditions, insurance coverage, partners, amendments, premiums, etc. Each attribute may vary independently of the other attributes. Thus a reinsurance contract may be viewed to have multiple dimensions depending on the number of independent variable attributes included in the reinsurance contract. For example, the multiple dimensions of a contract may include multiple reinsurance periods, multiple life cycle phases per insured period, multiple amendments per life cycle phase, etc.

In one embodiment, the reinsurance transaction processing software may include an object-oriented framework to process all reinsurance business transactions. In one embodiment, the graphical user interface software included in the reinsurance transaction processing software may use objects to manage various user interface functions. The object-oriented framework may include several classes of objects. In one embodiment, an entire reinsurance business transaction or a part thereof may be represented as a reinsurance contract object.

In one embodiment, the reinsurance transaction processing computer system may include a display screen 154, a user input device such as a keyboard 156 and a graphical user interface software to interact with the user. FIGS. 8a through 8d illustrate one embodiment of a display included in a graphical user interface to manage reinsurance business transactions. In one embodiment, the management of a reinsurance business transaction may include the management of a reinsurance contract. Examples of displays used to manage reinsurance contracts may include, but not be limited to, configuration displays to define initial terms and conditions, displays to modify or amend the contract, displays to compute premiums, time periods, etc. In one embodiment, a display may be defined as a display class and specific display objects may be created as instances of the display classes.

Display Layout

In one embodiment, a display or a window may include one or more window panels 804 and a navigational tool 802. In one embodiment, a window panel may occupy a portion of the display screen or an entire display screen. The window panel, which may be also referred to as a window or a panel, may be opened, closed, minimized, maximized, moved, resized, etc. The one or more windows, which may be arranged in a tiled or overlapping manner, may display data 806 associated with the reinsurance contract. In one embodiment, the arrangement and/or size of each window may be defined by the user or may be defaulted to a fixed layout by the reinsurance system software. In one embodiment, each window may display data associated with the methods and/or the properties of an object handled by the reinsurance system software, including a reinsurance contract object. Some or all of the data displayed may be modifiable by the user. In one embodiment, modifiable data 806 may be displayed on a white background. In one embodiment, non-modifiable data may be displayed on a gray background.

In one embodiment, the navigational tool 802 may provide one or more user interface items 808 such as icons, buttons, pull down menus, etc. to enable the user in navigating through various displays. In one embodiment, all graphical user interface functions accomplished by using the user interface items may also be accomplished by using special function keys on a keyboard 156, by a top level pull-down menu, etc. The navigational tool 802, in one embodiment, may include one or more tool panels 802a, 802b and 802c. In one embodiment, the position of the navigational tool may remain fixed regardless of the other windows included in the display. Each of the one or more tool panels 802a, 802b and 802c may provide navigational tools associated with displaying a particular reinsurance contract function. For example in one embodiment, a tool panel 802c may include up/down and/or left/right arrow buttons 802cb and an associated display field 802ca to assist the user in navigating through a section hierarchy. On selecting up/down and/or left/right arrow 802cb, the value displayed in the associated display field 802ca may change according to the user selection. If during the navigation process, the user has already reached at the top of a hierarchy then the tool panel 802c, which includes the up button 802cb, may be partially disabled or displayed in a lighter color.

In one embodiment, the interface item or items may be provided to the user to navigate within a display, for example, to select various ranges for a variable displayed within a tool panel 802. Interface items may be items displayed graphically on the window panel 804 and/or the tool panel 802 portion of the screen (for example, as icons or buttons) and may be selectable using input/output devices such as a mouse 158, joystick, or arrow keys on a keyboard 156. Interface items 808 may also be keyboard selections such as function keys or key combinations. For example, a button may be provided that allows the user to scroll down the list of valid entries in a pull-down menu.

The navigational tool 802 may be configurable in one embodiment. Each of the interface items 808 such as a button with an icon may represent a particular graphical user interface function. For example, the user may click on a particular button or icon included in the navigational tool 802 to navigate to a particular display. In one embodiment, clicking of an interface item 808 may initiate an action such as performing a calculation, printing of a report, etc. The user may configure the particular tool button by linking the click action to executing a particular graphical user interface function.

In one embodiment, the graphical user interface may include a hierarchy of displays related to a reinsurance contract. In one embodiment, by entering a reinsurance contract number into the display screen the user may access an initial contract display. In one embodiment, the reinsurance software may automatically display a list of all available contracts as the initial display. The initial display may represent the highest-level display within the hierarchy of displays. The navigational tool 802 may display the user interface items 808 to enable the user to select any dimension of the contract. In one embodiment, the dimensions of the reinsurance contract may include, but not be limited to, an insured period 802b, a life cycle phase, a section 802c, an amendment, and inheritable conditions, section classification and protection. In one embodiment, each of the display included in the hierarchy of displays may describe a dimension of the reinsurance contract.

In one embodiment, a user may initiate a business transaction to modify a downstream section, i.e., not the root or the main business section, to an existing reinsurance contract. On entering a valid contract number the initial display, e.g., a first window, may be displayed on the screen. The user may click on a down arrow 802cb from the section tool panel 802c included in the navigational tool 802, e.g. select a first interface item. In response, a second window may be displayed which may include data on the downstream or the child section, i.e., display downstream section data consistent with the user selected down arrow input. An authorized user may modify the modifiable data 806 displayed in the second window and on completing the modifications may click on a back arrow 802aa included in the tool panel 802a, e.g. selecting the second interface item, to return to the first window.

Various embodiments may further include receiving or storing instructions and/or data implemented in accordance with the foregoing description upon a carrier medium. Suitable carrier media include memory media or storage media such as magnetic or optical media, e.g., disk or CD-ROM, as well as signals or transmission media such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A computer readable medium comprising program instructions for amending one or more conditions of a reinsurance contract, wherein the program instructions are computer-executable to implement a method of:

identifying an inheritable class of objects to represent the one or more conditions of a reinsurance contract, wherein the reinsurance contract is represented by an reinsurance contract object, wherein the reinsurance contract object is a parent of a first section object, wherein the first section object represents one section of the reinsurance contract;

creating an instance of the inheritable class of objects to identify a condition object, wherein the condition object is a child of the first section object, wherein the condition object is connected to one or more section objects other than the first section object and the condition object inherits properties from the connected other section objects; and configuring properties and methods of the condition object consistent with the reinsurance contract to define an amended reinsurance contract;

wherein the reinsurance contract comprises the transfer by a first insurer of at least a portion of the risk associated with a primary insurance contract to a second insurer to provide protection to the first insurer against the risk associated with the primary insurance contract;

wherein the class of inheritable objects comprises a section classification class;

wherein the section classification class comprises properties, wherein the properties describe a country, a main class of business and a class of business associated with the section classification class.

2. The computer readable medium of claim 1, wherein the condition object is amended in context of the first section object.

3. The computer readable medium of claim 1, wherein the class of inheritable objects comprises a protection class.

4. The computer readable medium of claim 3, wherein the protection class comprises a proportional protection assignment subclass or a non-proportional protection assignment subclass.

5. The computer readable medium of claim 1, wherein the condition object describes a premium limit condition.

6. The computer readable medium of claim 1, wherein the condition object describes a share percentage condition.

7. The computer readable medium of claim 1, wherein the condition object describes a deduction condition.

8. The computer readable medium of claim 1, wherein configuring the properties and the methods of the condition object consistent with the reinsurance contract comprises:
  identifying a new condition of the inheritable object class, wherein the one or more conditions excludes the new condition;
  identifying a new subclass of objects to the reinsurance contract class of objects;
  creating a new component object by instantiating the new subclass of objects, wherein the new component object is a child object to the reinsurance contract object.

9. The computer readable medium of claim 1, wherein the program instructions are further computer-executable to implement:
  storing the one amended insurance contract in memory.

10. The computer readable medium of claim 1, wherein the computer readable medium comprises a memory medium.

11. A method comprising program instructions for amending one or more conditions of a reinsurance contract, wherein the method comprises:
  identifying an inheritable class of objects to represent the one or more conditions of a reinsurance contract, wherein the reinsurance contract is represented by an reinsurance contract object, wherein the reinsurance contract object is a parent of a first section object, wherein the first section object represents one section of the reinsurance contract;
  creating an instance of the inheritable class of objects to identify a condition object, wherein the condition object is a child of the section object, wherein the condition object is connected to one or more section objects other than the first section object and the condition object inherits properties from the connected other section objects; and
  configuring properties and methods of the condition object consistent with the reinsurance contract to define an amended reinsurance contract;
  wherein the reinsurance contract comprises the transfer by a first insurer of at least a portion of the risk associated with a primary insurance contract to a second insurer to provide protection to the first insurer against the risk associated with the primary insurance contract;
  wherein the class of inheritable objects comprises a section classification class;
  wherein the section classification class comprises properties, wherein the properties describe a country, a main class of business and a class of business associated with the section classification class.

12. The method of claim 11, wherein the condition object is amended in context of the first section object.

13. The method of claim 11, wherein the class of inheritable objects comprises a protection class.

14. The method of claim 13, wherein the protection class comprises a proportional protection assignment subclass or a non-proportional protection assignment subclass.

15. The method of claim 11, wherein the condition object describes a premium limit condition.

16. The method of claim 11, wherein the condition object describes a share percentage condition.

17. The method of claim 11, wherein the condition object describes a deduction condition.

18. The method of claim 11, wherein configuring the properties and the methods of the condition object consistent with the reinsurance contract comprises:
  identifying a new condition of the inheritable object class, wherein the one or more conditions excludes the new condition;
  identifying a new subclass of objects to the reinsurance contract class of objects;
  creating a new component object by instantiating the new subclass of objects, wherein the new component object is a child object to the reinsurance contract object.

19. The method of claim 11, wherein the method further comprises:
  storing the one amended insurance contract in memory.

20. A system for reinsurance transaction processing, comprising:
  a reinsurance contract framework;
  a multi-dimensional reinsurance contract framework;
  a condition component framework;
  a reinsurance contract object derived from the reinsurance contract framework;
  one or more insured period objects derived from the multi-dimensional reinsurance contract framework, wherein each insured period object is a child of the reinsurance contract object;
  one or more life cycle phase objects derived from the multi-dimensional reinsurance contract framework, wherein each life cycle phase object is a child of one of the insured period objects;
  one or more amendment objects derived from the multi-dimensional reinsurance contract framework, wherein each amendment object is a child of one of the life cycle phase objects;
  one or more section objects derived from the multi-dimensional reinsurance contract framework, wherein at least one section object is a child of one of the life cycle phase objects;
  one or more condition objects derived from the condition component framework, wherein at least one condition object is a child of one of the section objects; and
  wherein the one or more condition objects are configurable for the reinsurance transaction processing
  wherein the one or more amendment objects are operable to amend one or more condition objects, wherein the one or more amendment objects are shared amongst the one or more life cycle phase objects within the particular time period; and
  wherein the reinsurance contract comprises the transfer by a first insurer of at least a portion of the risk associated with a primary insurance contract to a second insurer to provide protection to the first insurer against the risk associated with the primary insurance contract.

21. The system of claim 20 further comprising a computer system to execute the reinsurance contract framework, the multi-dimensional reinsurance contract framework and the condition component framework.

22. The system of claim 21, wherein the computer system comprises a display device coupled to the computer system to display data.

23. The system of claim 22, wherein the display device is a display screen.

24. The system of claim 21, wherein the computer system comprises a user input device coupled to the computer system to enter data.

25. The system of claim 24, wherein the user input device is a mouse or a keyboard.

26. A computer readable medium comprising program instructions for a graphical user interface, wherein the program instructions are computer-executable to implement a method of:

displaying a first window comprising one or more window panels and a navigational tool, wherein the navigation tool comprises one or more tool panels, wherein each of the one or more tool panels or each of the one or more window panels comprises one or more interface items for receiving user inputs, wherein the one or more window panels and the one or more tool panels display data associated with one or more properties and one or more methods of a reinsurance contract object;

receiving a selection for a first interface item;

displaying a second window in response to receiving the selection for the first interface item, wherein the second window comprises one or more second window panels and the navigational tool, wherein the second window panels and the one or more tool panels display data consistent with receiving the selection for the first interface item;

receiving a selection for a second interface item to return to the first window;

wherein a hierarchy of windows comprises the first and second window and wherein the hierarchy of windows provides the graphical user interface to process a reinsurance business transaction, and wherein the reinsurance business transaction comprises the transfer by a first insurer of at least a portion of the risk associated with a primary insurance contract to a second insurer to provide protection to the first insurer against the risk associated with the primary insurance contract, wherein the reinsurance contract object comprises one or more insured period objects, wherein each insured period object identifies a particular time period during which a particular reinsurance contract remains in effect, and wherein each insured period object comprises one or more life cycle phase objects, and wherein each life cycle phase object identifies a particular phase in a life cycle of the particular reinsurance contract during the particular time period, wherein each life cycle phase object comprises one or more amendment objects, wherein the one or more amendment objects are operable to amend one or more condition objects, wherein the one or more amendment objects are shared amongst the one or more life cycle phase objects within the particular time period.

27. The computer readable medium of claim 26, wherein the first interface item is an icon.

28. The computer readable medium of claim 26, wherein the first interface item is a button.

29. The computer readable medium of claim 26, wherein the reinsurance contract object is configurable to process the reinsurance business transaction.

30. The computer readable medium of claim 26, wherein the reinsurance business transaction is a reinsurance contract transaction.

31. The computer readable medium of claim 26, wherein each life cycle phase object comprises one or more section objects, wherein the one or more section objects are arranged in a hierarchy starting with a main section, wherein each section object comprises children section objects.

32. The computer readable medium of claim 31, wherein each of the one or more section objects comprises one or more inheritable objects, wherein each inheritable object is owned by a section object, wherein each inheritable object is operable to inherit or share a method or a property from another section object.

33. The computer readable medium of claim 26, wherein the one or more window panels and the navigational tool are tiled together.

34. The computer readable medium of claim 26, wherein the one or more window panels and the navigational tool are non-overlapping.

35. The computer readable medium of claim 26, wherein the one or more window panels are user configurable for their size and their shape.

36. The computer readable medium of claim 26, wherein displaying data consistent with receiving the selection for the first interface item comprises:

executing a program to select the second window for display by using the received selection for the first interface item as an input;

accessing a database to retrieve the data associated with the second window.

37. A system for amending one or more conditions of a reinsurance contract, the system comprising:

a computer program; and a computer system;

wherein the computer program is executable on the computer system to execute the method of:

identifying an inheritable class of objects to represent the one or more conditions of a reinsurance contract, wherein the reinsurance contract is represented by an reinsurance contract object, wherein the reinsurance contract object is a parent of a first section object, wherein the first section object represents one section of the reinsurance contract;

creating an instance of the inheritable class of objects to identify a condition object, wherein the condition object is a child of the first section object, wherein the first section object horizontally inherits properties from the same section object in another, linked reinsurance contract; and configuring properties and methods of the condition object consistent with the reinsurance contract to define an amended reinsurance contract;

wherein the reinsurance contract comprises the transfer by a first insurer of at least a portion of the risk associated with a primary insurance contract to a second insurer to provide protection to the first insurer against the risk associated with the primary insurance contract;

wherein the class of inheritable objects comprises a section classification class;

wherein the section classification class comprises properties, wherein the properties describe a country, a main class of business and a class of business associated with the section classification class.

38. The system of claim 37, wherein the computer system comprises a display device coupled to the computer system to display data.

39. The system of claim 38, wherein the display device is a display screen.

40. The system of claim 37, wherein the computer system comprises a user input device coupled to the computer system to enter data.

41. The system of claim 40, wherein the user input device is a mouse or a keyboard.

* * * * *